(12) United States Patent
Laine et al.

(10) Patent No.: US 8,242,037 B2
(45) Date of Patent: Aug. 14, 2012

(54) METHOD OF PRESSURELESS SINTERING PRODUCTION OF DENSIFIED CERAMIC COMPOSITES

(75) Inventors: Richard M. Laine, Ann Arbor, MI (US); Min Kim, Seoul (KR)

(73) Assignee: The Regents of the University of Michigan, Ann Arbor, MI (US)

( * ) Notice: Subject to any disclaimer, the term of this patent is extended or adjusted under 35 U.S.C. 154(b) by 384 days.

(21) Appl. No.: 12/508,107

(22) Filed: Jul. 23, 2009

(65) Prior Publication Data
US 2010/0130346 A1 May 27, 2010

Related U.S. Application Data

(60) Provisional application No. 61/083,336, filed on Jul. 24, 2008.

(51) Int. Cl.
*C04B 35/00* (2006.01)

(52) U.S. Cl. .......... 501/94; 501/103; 501/104; 501/105; 501/108; 501/118; 501/119; 501/120; 501/126; 501/127; 423/274; 427/126.1; 427/126.6; 427/213.31; 427/213.32; 427/215; 977/773

(58) Field of Classification Search .................. 501/94, 501/103–105, 108, 118–120, 126, 127; 427/126.1, 427/213.31, 215, 216; 423/274; 977/773
See application file for complete search history.

(56) References Cited

U.S. PATENT DOCUMENTS

| | | |
|---|---|---|
| 5,958,361 A | 9/1999 | Laine |
| 2005/0227864 A1 | 10/2005 | Sutorik |
| 2006/0087062 A1 | 4/2006 | Laine |

OTHER PUBLICATIONS

International Search Report mailed Mar. 5, 2010.
Kim, Min; Mixed-Metal Oxide Nanopowders by Liquid-Feed Flame Spray Pyrolysis: Synthesis and Processing of Core-Shell Nanoparticles; pp. 88-103; May 8, 2008.

*Primary Examiner* — Steven Bos
(74) *Attorney, Agent, or Firm* — Harness, Dickey & Pierce, P.L.C.

(57) ABSTRACT

Methods of making and compositions of dense sintered ceramic nano- and micro-composite materials that are highly stable in a variety of conditions and exhibit superior toughness and strength. Liquid feed flame spray pyrolysis techniques form a plurality of nanoparticles (e.g., powder), each having a core region including a first metal oxide composition comprising Ce and/or Zr or other metals and a shell region including a second metal oxide composition comprising Al or other metals. In certain aspects, the core region comprises a partially stabilized tetragonal $ZrO_2$ and the shell region comprises an $\alpha$-$Al_2O_3$ phase. The average actual density of the ceramic after sintering is greater than 50% and up to or exceeding 90% of a theoretical density of the ceramic.

24 Claims, 11 Drawing Sheets

US 8,242,037 B2

METHOD OF PRESSURELESS SINTERING PRODUCTION OF DENSIFIED CERAMIC COMPOSITES

CROSS-REFERENCE TO RELATED APPLICATIONS

This application claims the benefit of U.S. Provisional Application No. 61/083,336, filed on Jul. 24, 2008. The entire disclosure of the above application is incorporated herein by reference.

FIELD

The present disclosure relates to methods of making dense ceramics having superior properties and more specifically to methods of making ultrafine nano and/or micro-structured composites via sintering of core-shell nanopowders to produce highly dense ceramic composite materials having superior properties.

INTRODUCTION

The statements in this section merely provide background information related to the present disclosure and may not constitute prior art. Zirconium oxide or zirconia ($ZrO_2$) commonly has at least three phases, including monoclinic, tetragonal, and cubic. Partially stabilized tetragonal zirconia (PSZ) is desirable because it, as well as certain related materials, are part of a special class of ceramics having beneficial toughness. The toughness of this special class of ceramics arises from their ability to undergo phase transformation from a tetragonal to a monoclinic phase, during which stress fields are introduced around the transformed grain that successfully limit crack propagation, thereby strengthening the ceramic composite.

In order to retain the tetragonal phase during processing, a number of additives can be used to partially stabilize the tetragonal phase, such as yttria ($Y_2O_3$). Thus, yttria stabilized tetragonal zirconia (YPSZ) (for example, 3 wt. % yttria or 3YPSZ) materials are used for a wide range of structural applications employing tough ceramic materials, by way of non-limiting example, including hip, knee and dental prosthetics, and ceramic knives. In addition, PSZ materials can be used for catalytic, electronic, and energy applications, including thin films in electronic devices, solid oxide fuel cells, and automotive exhaust catalysts.

Unfortunately, PSZ and especially 3YPSZ undergo unwanted phase transformation to the monoclinic phase in humid environments, often occurring even at ambient conditions. One solution is to form composite materials with other harder and more weather-resistant materials, such as α-alumina (α-$Al_2O_3$), one of the more common additional components of such composite materials. Thus, yttria stabilized tetragonal zirconia (e.g., 3YPSZ) toughened alumina (known as "ZTA") offers toughening that is directly proportional to the total 3YPSZ contents. The α-$Al_2O_3$ component provides added hardness and tensile strengths, as well as important resistance to environmental degradation. However, the very properties that make both ceramic materials valuable for this type of composite also render them very difficult to process to full density. For example, hot isostactic pressing (HIPing) can be employed to overcome these problems, but densities resulting from HIPing can often be significantly less than desired.

Thus, there is a need for developing methods of making improved, stable, densified ceramic materials such as ultrafine micro- and/or nano-structured composites, having improved mechanical properties, including high density and toughness, and for use in various potential structural applications, e.g., prosthesis implants and other applications, including fuel cell membranes and catalyst support materials and catalytic membranes for gas separation, for example.

SUMMARY

This section provides a general summary of the disclosure, and is not a comprehensive disclosure of its full scope or all of its features.

The present technology includes compositions, methods of manufacture, and articles of manufacture relating to dense ceramic composite materials. Methods of making dense ceramic nano- and/or micro-structured or ultrafine composites can include the following aspects. A liquid precursor stream is aerosolized with oxygen to form an aerosolized stream, where the liquid precursor stream includes a first metal oxide precursor and a second distinct metal oxide precursor. The aerosolized stream is combusted to form a plurality of respective nanoparticles having an average particle size diameter of less than or equal to about 500 nm. The nanoparticles define a core region including a first oxide composition formed from the first metal oxide precursor and a shell region including a second oxide composition formed from the second metal oxide precursor. The first oxide composition has a first bulk diffusion rate that is distinct from a second bulk diffusion rate of the second oxide composition. A green body is formed from the plurality of nanoparticles and is sintered to form the ceramic composite having an average actual density of greater than or equal to about 90% of a theoretical density of the sintered ceramic composite.

Methods of making dense ceramic nano and/or micro-structured ultrafine composites further include aerosolizing a liquid precursor stream with oxygen to form an aerosolized stream, where the liquid precursor stream comprises a first precursor comprising zirconium and a second precursor comprising aluminum. The aerosolized stream is combusted to form a plurality of nanoparticles having an average particle size diameter of less than or equal to about 500 nm. Each respective nanoparticle comprises a core region and a shell region disposed around the core region, where the core region comprises the zirconium oxide ($ZrO_2$) and the shell region comprises aluminum oxide ($Al_2O_3$). A green body is formed that comprises the plurality of nanoparticles and the green body is sintered to form the dense ceramic composite having an average actual density of greater than or equal to about 50% of a theoretical density of the sintered ceramic composite. At least a portion of the aluminum oxide ($Al_2O_3$) comprises a δ-$Al_2O_3$ phase prior to or during the sintering that is transformed to an α-$Al_2O_3$ phase after the sintering.

Dense ceramic nano and/or micro-structured ultrafine composites are provided that include a plurality of sintered nanoparticles respectively having a core region and a shell region. The core region includes a first metal oxide composition having at least one element selected from zirconium (Zr), cerium (Ce), aluminum (Al), magnesium (Mg), yttrium (Y), nickel (Ni), cobalt (Co), zinc (Zn), iron (Fe), and mixtures thereof. The shell region includes a second metal oxide composition having aluminum oxide ($Al_2O_3$). The sintered ceramic composite has an average actual density of greater than or equal to about 95% of a theoretical density of the sintered ceramic composite. For example, the dense ceramic can have a first metal oxide composition that includes cerium oxide ($CeO_2$), zirconium oxide ($ZrO_2$), cerium zirconium oxide (CeZrO$_2$), spinel or magnesium aluminate (MgAl$_2$O$_4$) and/or yttrium aluminate garnet (Y$_3$Al$_5$O$_{12}$).

The present compositions and methods may also include combusting a precursor solution in which the core material is present as a suspension of oxide nanoparticles and the shell material is present as a precursor of the shell oxide.

Further areas of applicability will become apparent from the description provided herein. The description and specific examples in this summary are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
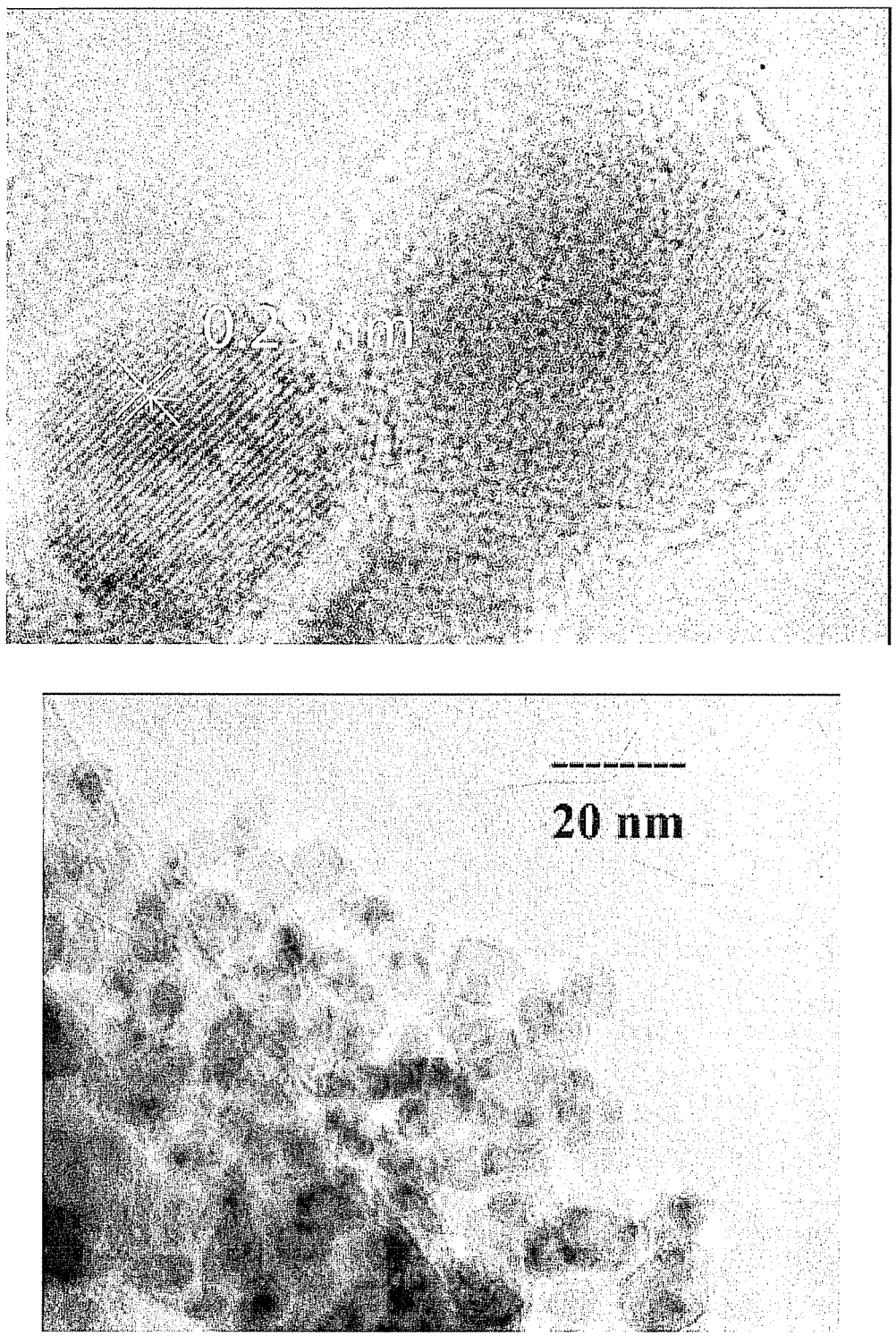
FIG. 1 shows two transmission electron microscopy (TEM) images of (ZrO$_2$)$_{0.54}$(Al$_2$O$_3$)$_{0.45}$ nanoparticle powders showing unidirectional lattice planes.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. The following definitions and non-limiting guidelines must be considered in reviewing the description of the technology set forth herein.

The headings (such as "Introduction" and "Summary") and sub-headings used herein are intended only for general organization of topics within the present disclosure, and are not intended to limit the disclosure of the technology or any aspect thereof. In particular, subject matter disclosed in the "Introduction" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

The citation of references herein does not constitute an admission that those references are prior art or have any relevance to the patentability of the technology disclosed herein. All references cited in the "Detailed Description" section of this specification are hereby incorporated by reference in their entirety.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the apparatus and systems of this technology and, unless explicitly stated otherwise, are not intended to be a representation that given embodiments of this technology have, or have not, been made or tested.

As referred to herein, all compositional percentages are by weight of the total composition, unless otherwise specified. As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present technology that do not contain those elements or features.

"A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. In addition, disclosure of ranges includes disclosure of all distinct values and further divided ranges within the entire range.

The present technology relates to densified ceramic composites, including those made by pressureless sintering methods. Partially stabilized tetragonal zirconia (PSZ) is desirable because of its toughness. The toughness provides the ability to undergo phase transformation from the tetragonal to the monoclinic phase with a subsequent 4.0% volume increase that introduces stress fields around the transformed grain that greatly limit crack propagation within the vicinity of that grain, thereby desirably toughening the ceramic. In order to retain the tetragonal phase of zirconia during processing, a number of additives have been developed that partially stabilize the tetragonal phase, such as yttria ($Y_2O_3$). Unfortunately, PSZ and especially 3YPSZ undergo unwanted phase transformation to the monoclinic phase in humid environments, where this sometimes occurs at ambient conditions. One solution in the past has been to form composite materials with other harder and more weather resistant materials, such as $\alpha$-$Al_2O_3$, which is generally used as a component of such ceramic composite materials.

Zirconia toughened alumina (ZTA) is widely known to combine the high hardness of alumina with the high toughness of tetragonal zirconia. ZTA has high toughness, good resistance to wear for the structural applications in general, and chemical stability for prosthetic applications in particular. Pure, dense alumina offers relatively high hardness (e.g., 1500 $Kg/mm^2$) with good flexural strength (e.g., 380 MPa) but relatively poor toughness (e.g., $K_{IC}$=4 $MPa*m^{1/2}$), while yttria partially stabilized tetragonal zirconia provides higher flexural strength (e.g., 900 MPa), higher toughness (e.g., $K_{IC}$=15 $MPa*m^{1/2}$), but lower hardness (e.g., 1100 $Kg/mm^2$), and can self-degrade to the monoclinic phase under 400° C. through surface reactions with water. Therefore $(ZrO_2)_{1-x}(Al_2O_3)_x$ composites offer enhanced mechanical properties compared with pure t-zirconia and $\alpha$-alumina.

For ZTA, compositions often contain up to about 30 wt. % (26 mole %, 24 vol. %) partially stabilized t-zirconia, and offer improved mechanical properties (e.g., fracture toughness $K_{IC}$=5-10 $MPa*m^{1/2}$; flexural strength=about 500-940 MPa) for structural applications by using the martensitic transformation of tetragonal zirconia to monoclinic zirconia in an $\alpha$-alumina matrix. At room temperature, the magnitude of toughening is proportional to the magnitude of the fracture toughness. Zirconia (3YPSZ) toughened alumina or ZTA offers toughening that is directly proportional to the total 3YPSZ contents.

The $\alpha$-$Al_2O_3$ component provides added hardness and tensile strengths and more importantly resistance to environmental degradation. Unfortunately, the properties that make both ceramic materials valuable for this type of composite also make them quite difficult to process to full density. Most processes start with $\alpha$-alumina powders, such that final densities with pressureless sintering are typically less than or equal to about 96%, because of the low grain boundary diffusivities of t-zirconia and $\alpha$-alumina (e.g., about 10-25/$m^3s^{-1}$) at normal sintering temperatures prohibiting densification of ZTA composites. Thus, for example, hot isostatic pressing (HIPing) is used frequently to overcome these problems, but even densities resulting from HIPing are often significantly less than desired.

Conventional ZTA processing involves mechanical mixing of micron-sized partially stabilized zirconia/pure $\alpha$-alumina powders or sol-gel processing of zirconia/alumina precursor mixtures. ZTA composites with about 30 wt % yttria stabilized zirconia using sol-gel methods can be produced. However, grain sizes of conventional ceramic materials formed via conventional ZTA methods are micron-size. Thus, for ZTA with micron size grains, yttria is used as a stabilizer to retain partially stabilized t-zirconia during processing. Tetragonal zirconia with less than or equal to about 3 mole % yttria will transform to the monoclinic zirconia causing about a 4% volume expansion. For additions of more than about 3 mol % (about 3.6 mole %) yttria, t-zirconia transforms to cubic zirconia during processing with low fracture toughness ($K_{IC}$=5 $MPA*m^{1/2}$) limiting mechanical properties. While not limiting the present technology to any particular theory, it is believed that ceramics, with very fine grains of less than about 1 μm, such as ZTA, can have partially stabilized tetragonal zirconia without any stabilizing dopant due to smaller or ultrafine grain sizes.

Furthermore, both powder mixing and sol-gel processing require multiple steps to produce green compacts. Conventional pressureless sintering typically exceeds temperatures of at least about 1600° C., followed by HIPing at greater than or equal to about 1500° C. to achieve final composite densities of about 99% or more of the theoretical density. This is mainly due to the similar grain boundary diffusivity (about 10-25/$m^3s^{-1}$) of t-zirconia and $\alpha$-alumina. Such types of processing take significantly longer to conduct, consume greater amounts of energy, are expensive, and can also lead to undesirable grain growth.

In various aspects, the present disclosure provides a method of making dense ultrafine nano- and/or micro-structured ceramics comprising a plurality of nano- and/or micro-sized particles or composites particles or composites. By "nano- and/or micro-sized" it is meant that each particle or domain has at least one dimension that is less than about 500 nm (0.5 μm), optionally less than about 100 nm (0.1 μm), optionally less than about 50 nm, and optionally less than about 10 nm. In accordance with the present technology, a plurality of such nano- and/or micro-sized particles can be created in the form of a powder, which are then processed to a green body form, and then sintered to a dense ultrafine ceramic product. After processing, the nano- and/or micro-sized particles are sintered to form an nano- and/or micro-structured ultrafine grain ceramic, which may have an average grain size of less than or equal to about 200 nm, optionally less than or equal to about 100 nm, optionally less than or equal to about 50 nm, and in certain aspects, optionally less than or equal to about 20 nm.

In various aspects, the method includes using a technique called liquid-feed flame spray pyrolysis (LF-FSP) to form nanoparticles in accordance with the present technology. Such LF-FSP techniques are described in U.S. Pat. No. 7,220, 398 to Sutorik, et al. First, a liquid precursor stream is aerosolized with oxygen (or an oxygen or oxidant containing stream) to form an aerosolized stream. Aerosolization or atomization of the liquid feed can be conducted by known techniques, including Bernoulli misters, cross-flow atomizers, fog misters, ultrasonic misters, high pressure spray nozzles, and the like. The liquid precursor stream comprises a first metal oxide precursor and a second metal oxide precursor. Thus, the liquid precursor stream comprises a mixture of metal oxide precursors that ultimately form metal oxide compositions, such as metalloorganic precursors (single- or mixed-metal alkoxides, carboxylates or β-diketonates), which are optionally dissolved in alcohol solvents (typically ethanol) or suspended in a solvent/carrier.

Suitable examples of metal oxide precursors are alkoxides or $C_{1-6}$ carboxylates of the desired metal elements employed, optionally containing further complexed oxygenated ligands, and optionally bearing metal-bound hydroxyl (hydroxide) ligands. In certain aspects, the metal oxide precursors are soluble in volatile, low viscosity oxygenated solvents, which themselves may contribute complexing ligands, to form atomizable liquid feeds substantially free of solids, except as described for certain applications hereafter. Metal carboxylates and/or alkoxides are commercially available or can be prepared by customary synthetic methods known to those of skill in the art. Suitable carboxylates are generally carboxylates of carboxylic acids having from 1 to about 10 carbon atoms, optionally from 3 to 6 carbon atoms, which may also contain further oxygen atoms in the form of aldehyde, keto, ether, or hydroxyl groups; e.g., methoxyacetic acid, and the like. Particularly useful metal carboxylates include those in which the metal is bonded to one or more hydroxide groups, e.g. $Y(OH)(O_2CCH_2XMe)_2$, where Y is metal, Me is methyl, and X is O, $CH_2$, or CHMe.

In certain aspects, the metal oxides useful in accordance with the present disclosure include one or more elements selected from the groups of metals (e.g., aluminum, gallium, indium, tin, thallium, lead, or bismuth), transition and rare-earth metals, including lanthanides and actinides (e.g., titanium, zirconium, cerium) and metalloids or semi-metals (e.g., silicon, germanium). In various aspects, the present disclosure contemplates a variety of metal oxides used in accordance with the methods described herein, so long as the respective metal oxides are mutually immiscible with one another. In certain aspects of the present disclosure, the relative amounts of metal oxide precursors are selected so that phase segregation of at least one phase occurs such that a heterogeneous particle is produced, where at least one phase comprises a first oxide composition and at least one additional phase comprises a second oxide composition. Preferably, phase segregation forms an incomplete (or nearly complete) core/shell structure, where the core region comprises the first oxide composition and the shell region (which as used herein may provide continuous or discontinuous coverage of the core region) comprises a second oxide composition.

The present technology may further employ precursors that include one or more various particles, such as metal oxide nanopowders suspended in liquid, including those described by U.S. Pub. No. 2006/0087062 to Laine et al. published Apr. 27, 2006. For example, the various nanoparticles formed by the present methods may be used as precursor nanoparticles. These precursor nanoparticles may be coated with a shell of an oxide composition formed from a metal oxide precursor.

For example, precursor nanoparticles may be introduced into a flame with a temperature of from about 400° C. to less than about 2000° C. This can produce particles with altered crystalline phase, particles having particles of different compositions adhered to their surface, and/or metal oxide particles coated with metals. Preformed particles can be processed using LF-FSP by injection into the high temperature zone along with liquid precursor of the same composition or a different composition. As a result, particles having a different morphology and/or composition than the initial particles are formed.

The different particle morphology and/or composition may take several forms. For example, the initial particles may be coated with solid derived from the liquid precursor; may comprise but a single phase with its composition derived from both the composition of the preformed particles and from the liquid precursor; may contain two or more distinct phases, e.g. crystalline phases of different composition or crystalline phases of the same composition but different crystal structures; or may contain particles of one or more phases enriched at the surface with elements or compounds derived from the precursor. By suitable selection of solvent dispersing media, solid particles of similar or identical composition but different morphology may be obtained, and hollow particles may also be obtained. By these techniques, changes in particle size and particle size distribution may also be obtained.

In some aspects, precursor particles may be derived from numerous sources. They may, for example, be of natural origin, such as fine clay, diatomaceous earth, finely ground minerals such as bauxite, ash, for example fly ash, rutile, and garnet, or may be of wholly synthetic manufacture, for example particles produced by high temperature flame hydrolysis, liquid feed spray pyrolysis, solution precipitation, etc. Synthetic particles are preferred, most preferably metal oxides or mixed metal oxides prepared by high temperature flame processes, and most preferably metal oxides and mixed metal oxides which exhibit exceptional high temperature stability, such as silicates, and oxides and mixed oxides of transition metals, and especially of silicon, aluminum, and titanium, with or without additional elements such as the main group 1 and 2 elements, carbon, boron, phosphorous, arsenic, etc., the latter group generally in relatively low concentration. For example, carbon may be present in the form of carbides, while phosphorous, arsenic, boron, etc., may be dopants in a matrix of metal oxide, as also may be transition elements, particularly lanthanides and actinides, for example silica or titania doped with Ce, Pr, Nd, Yb, etc.

During the aerosolizing process the metal oxide precursors are mixed with oxygen and then ignited for combusting the aerosolized stream. During the combusting, the organic components of the precursors volatilize or combust, thus forming a plurality of nanoparticles in a powder form. After the plurality of nanopowders is formed, they generally have a respective average particle size of less than about 500 nm, optionally less than about 200 nm, optionally less than about 100 nm, optionally less than about 50 nm, optionally less than about 20 nm, as described above. In certain aspects an average particle size of the respective nanoparticles is about 10 to 100 nm, optionally about 20 to about 50 nm, and in certain aspects, about 20 to 30 nm. In certain aspects, typical nanoparticulate powders formed via LF-FSP processes have average particle sizes (APSs) of about 15 to about 100 nm with specific surface areas (SSAs) of about 30 to about 100 $m^2/g$.

In various aspects, the methods of the present technology form dense nanoparticles by first combusting a liquid precursor stream aerosolized with oxygen to form a plurality of nanoparticles (e.g., nanopowders). The liquid precursor stream comprises a first metal oxide precursor and a second distinct metal oxide precursor. The aerosolized liquid precursor stream is combusted in accordance with the LF-FSP techniques above to form a plurality of respective nanoparticles having an average particle size diameter of less than or equal to about 500 nm. Each nanoparticle further defines a core region comprising a first oxide composition formed from the first metal oxide precursor and a shell region comprising a second oxide composition formed from the second metal oxide precursor. The first oxide composition has a first bulk diffusion rate that is distinct from a second bulk diffusion rate of the second oxide composition. In certain aspects, the first bulk diffusion rate is less than the second bulk diffusion rate. The method optionally comprises quenching the aerosolized stream after combusting in the LF-FSP process to form the plurality of nanocomposite particles.

As noted above, the LF-FSP process aerosolizes mixtures of metalloorganic precursors (single- or mixed-metal alkoxides, carboxylates or β-diketonates) dissolved in alcohol solvents (e.g., ethanol) at known concentration levels using oxygen. In certain aspects, the resulting aerosol stream is ignited via methane pilot torches followed by combusting the mixture into a quartz chamber about 1.5 m long. In certain embodiments, initial combustion temperatures are about 1500° to about 2000° C., depending on the processing conditions, generating nanoparticle powder "soot" collected using wire-in-tube electrostatic precipitators (ESP). Baghouse filters or other conventional particulate filtration systems may also be employed to recover the nanoparticles formed during LF-FSP.

In certain aspects, temperatures are reduced in the LF-FSP process about 300° C. to about 500° C. over about 1.5 meters, which is about equivalent to a 1000° C. quench in less than or equal to about 100 msec, leading to kinetic products and nanopowders that are largely unaggregated; although in certain circumstances, the plurality of nanoparticles may be lightly agglomerated. "Shooting" rates of the aerosolized stream, for example, can be up to about 300 g/h when using wire-in-tube electro static precipitators operating at about 10 kV.

Next, the plurality of nanoparticles or nanopowders is formed into a green material or a green body form. The green body is in a pre-sintered or pre-fired state. Prior to forming the green materials; however, the nanopowders may be further processed, such as drying or by grinding to achieve a more uniform particle size distribution prior to forming the green body. Often, green bodies are formed by mixing one or more additional ingredients, such as casting agents or binder materials with the nanopowders, as are well known to those of skill in the art. By way of non-limiting example, an aqueous solution of ammonium polymethacrylate (commercially available from the R.T. Vanderbilt Co. as DARVAN® C—N) is mixed with the plurality of nanoparticles/nanopowder. In another embodiment, surface active or binder agents may also be introduced to the dispersion/mixture. Suitable examples of binders include polyalkylene glycols, such as polyethylene glycols. Optionally, a solvent or carrier can be used to mix the nanopowder and additional ingredients to form a dispersion. Suitable solvents or vehicles include water and/or alcohols, like ethanol. The mixture may be agitated by any means known in the art, such as mechanical mixing, sonication, and the like.

In certain alternate aspects, LF-FSP generated powders are optionally suspended in a liquid comprising a solvent or carrier to form shells. Also, in certain embodiments, LF-FSP powders are suspended in a liquid that will generate core-shell nanoparticles through the LF-FSP process. In yet other embodiments, a pre-formed nanoparticle can be combined with a precursor metal oxide in the LF-FSP process, generally after forming the aerosolized stream, but prior to combustion, such that after LF-FSP processing, a ceramic coating is formed comprising the metal oxide composition disposed over a core formed by the original nanoparticle.

By way of example, in one aspect, the nanoparticulate powders produced via combustion in the LF-FSP process are dispersed ammonium polymethacrylate (DARVAN® C—N) in ethanol using sonication applied via an ultrasonic horn. The dispersion is allowed to settle, for example, for a day. Thereafter, the mixture/emulsion is further processed by adding a binder/surfactant, polyethylene glycol (e.g., PEG 3400 D from Sigma-Aldrich) and again treating the mixtures with the ultrasonic horn for an additional length of time, for example about 6 hours.

In certain aspects, the mixture/dispersion is rotary evaporated (for example, for 1-5 hours) and air-dried with heat applied (for example, for 12 hours at 150° C.). After air drying, the dispersion is put in a heated vacuum oven (e.g., at 200° C. for 12 hours). The dried powders are then optionally lightly ground. In certain aspects, the dried powder can be screened or sieved to remove certain particle sizes and/or to provide a more uniform particle size distribution, for example by using a −325 nylon mesh (passing particle size of less than about 44 μm). The ground and sieved powder is then compacted or pressed (e.g., 50 MPa) in a dual action 12 mm WC die followed by cold isostatic pressing (CIPing) (e.g., 200 MPa) (Autoclave Engineers, Erie, Pa.) for about 6 hours to form the green body. In certain aspects, compaction to form the green body is achieved by cold isostatic pressing (CIPing) or other similar compression/densification processes.

Next, the green body (e.g., pressed pellets) is sintered. In certain aspects the sintering process may be proceeded by an earlier heating step, also commonly referred to as a debinding step, where any residual surface or internal impurities, including binders, casting agents, or remaining solvent or uncombusted precursors are burned off or volatized to form a compact. Thus, prior to sintering, the green body is optionally subjected to binder burn-out or a debinding step by heating in air (e.g., 1° C./min to 800° C., followed by a dwell at 800° C. for 6 hours). Thereafter the organic material-free compact can be sintered by controlled heating in a controlled atmosphere. In certain aspects, sintering is conducted at temperatures greater than or equal to about 800° C., optionally greater than or equal to about 900° C., optionally greater than or equal to about 1,000° C. and in certain aspects greater or equal to about 1,100° C. In certain aspects, the sintering of the green body compact is conducted at temperatures of less than or equal to about 1250° C.

The resulting nano- and/or micro-structured ultrafine ceramic material formed after sintering is a dense ceramic. As used herein, a "dense ceramic" has an average actual density of greater than or equal to about 50% of a theoretical density of the sintered ceramic composite. The theoretical density is a calculated value based on the respective phase compositions of the ceramic material, including the sintered nanoparticle powder. In certain aspects an average actual density is optionally greater than or equal to about 60% of theoretical density of the sintered ceramic composite material, optionally greater than or equal to about 70% of theoretical density, optionally greater than or equal to about 75% of theoretical density, optionally greater than or equal to about 80% of theoretical density, optionally greater than or equal to about 85% of theoretical density, optionally greater than or equal to about 90% of theoretical density, optionally greater than or equal to about 95% of theoretical density, optionally greater than or equal to about 97% of theoretical density, optionally greater than or equal to about 98% of theoretical density and in some aspects, greater than or equal to about 99% of the theoretical density of the sintered ceramic composite material.

In certain aspects, at least a portion of the second metal oxide composition (which forms the shell region of the nanoparticle) undergoes a phase transformation prior to or during sintering. In certain aspects, the metal oxide composition in the core region has a lower bulk diffusion rate than metal oxide composition forming the shell region, such that sintering can occur at temperatures well below the point at which the core species show significant rates of diffusion. In this regard, the metal oxide composition forming the shell region may undergo a phase transformation before or during sintering and where the metal oxide composition forming the core region may also undergo a phase transformation during or after the sintering process.

By way of example, the first metal oxide composition can comprise zirconium oxide ($ZrO_2$) and the second metal oxide composition can comprise aluminum oxide ($Al_2O_3$). In various aspects, at least a portion of the aluminum oxide ($Al_2O_3$) comprises a $\delta$-$Al_2O_3$ phase prior to sintering. The $\delta$-$Al_2O_3$ phase is transformed or partially transformed to an $\alpha$-$Al_2O_3$ phase after sintering, while at least a portion of the zirconium oxide ($ZrO_2$) is a stable tetragonal-zirconium oxide phase. Desirably, the phase transformation from $\delta$-$Al_2O_3$ to $\alpha$-$Al_2O_3$ can occur at a temperature below the typical phase transformation temperature (of about 1200° C. at ambient pressure), for example, during sintering. In certain aspects, at least a portion of the zirconium oxide ($ZrO_2$) in the core region after the sintering comprises a stable tetragonal-zirconium oxide phase (t-$ZrO_2$). Furthermore, the combusting and sintering is preferably conducted at a temperature and a pressure that minimizes grain growth, while controlling phase transformation of α-alumina from a δ-alumina and simultaneously preventing phase transformation of monoclinic zirconia phase to tetragonal zirconia phase. Notably the nanocomposite ceramics and the particles which form the ceramics are substantially free of yttria ($Y_2O_3$), yet have a partially stabilized t-$ZrO_2$ at advantageous high densities.

In certain aspects, δ-alumina is believed to have a much higher grain boundary diffusivity (10-23/$m^3s^{-1}$) than t-zirconia (10-25/$m^3s^{-1}$) at greater than or equal to about 800° C., thus t-$(ZrO_2)_x(Al_2O_3)_{1-x}$ core-shell nanopowders formed in accordance with the present technology are able to sinter more readily. Furthermore, the δ-alumina shell may sinter on its own, while the tetragonal zirconia (having slower bulk diffusion rates) contributes relatively little to densification of the ceramic. Thus, in certain aspects, the microstructure of separated nano-size t-zirconia grains without yttria and α-alumina grains due to heating from sintering procedure have no pores. In certain aspects, final nanoparticle ceramic composites with nano-size t-zirconia and α-alumina grains using $(ZrO_2)_x(Al_2O_3)_{1-x}$ core-shell nanopowders can be produced with average particle size diameters of less than or equal to about 100 nm.

In certain aspects, the present disclosure provides a method of making a dense ceramic nanocomposite, which comprises aerosolizing a liquid precursor stream with oxygen to form an aerosolized stream. The liquid precursor stream comprises a first precursor comprising zirconium and a second precursor comprising aluminum. The aerosolized stream is then combusted to form a plurality of nanoparticles an average particle size of less than or equal to about 500 nm. These nanoparticles are formed into green bodies, via compaction and/or densification. Then the green body is optionally subjected to binder burn out and thereafter sintered to form a dense ceramic having an average actual density of greater than or equal to about 100% of a theoretical density of the nanoparticles.

Each respective nanoparticle comprises a core region and a shell region disposed around the core region. The core region optionally comprises zirconium oxide ($ZrO_2$). The shell region optionally comprises aluminum oxide ($Al_2O_3$) and/or iron oxide ($Fe_2O_3$). In certain aspects, the core region comprises zirconium oxide ($ZrO_2$) and the shell region comprises aluminum oxide ($Al_2O_3$). At least a portion of the aluminum oxide ($Al_2O_3$) comprises a δ-$Al_2O_3$ phase prior to and during the forming of a green body or binder burnout step and is subsequently transformed to an α-$Al_2O_3$ phase after sintering. Desirably, at least a portion of the zirconium oxide ($ZrO_2$) remains as the stable tetragonal-zirconium oxide phase.

In certain aspects, a ratio of the first metal oxide composition to the second metal oxide composition ranges from about 1:100 to about 100:1, optionally from about 1:50 to 50:1, optionally about 1:25 to about 25:1, optionally about 1:10: to 10:1, optionally about 1:5 to about 5:1, and in certain aspects, optionally about 1:1. In yet other aspects, a ratio of the zirconium oxide ($ZrO_2$) to the aluminum oxide ($Al_2O_3$) in the nanoparticle ranges from about 1:100 to about 100:1, optionally from about 1:50 to 50:1, optionally about 1:25 to about 25:1, optionally about 1:10: to 10:1, optionally about 1:5 to about 5:1, and in certain aspects, optionally about 1:1 by weight.

In various aspects, a densified ceramic nano and/or micro-structured ultrafine composite is formed according to the methods of the present technology, which has a plurality of nanoparticles each having a core region comprising a first metal oxide composition with at least one element selected from zirconium (Zr), cerium (Ce), aluminum (Al), magnesium (Mg), yttrium (Y), magnesium (Mg), nickel (Ni), cobalt (Co), zinc (Zn), iron (Fe) and mixtures thereof. In certain aspects, the first metal oxide composition comprises at least one element selected from zirconium (Zr), cerium (Ce), aluminum (Al), magnesium (Mg), yttrium (Y), and mixtures thereof. The nanoparticle also has a shell region comprising a second metal oxide composition comprising aluminum (Al), such as aluminum oxide ($Al_2O_3$).

In certain alternate embodiments, the second metal oxide composition may comprises iron (Fe), such as iron oxide ($Fe_2O_3$). The final sintered ceramic product, or nano- or micro-structured ultrafine composite product, thus has an average actual density of greater than or equal to about 90% of its theoretical density. The first metal oxide composition comprises cerium oxide ($CeO_2$), zirconium oxide ($ZrO_2$), cerium zirconium oxide ($CeZrO_2$), spinel or magnesium aluminate ($MgAl_2O_4$), spinel materials having a formula of $(MO)_{1-x}(Al_2O_3)_x$, where M is magnesium (Mg), nickel (Ni), cobalt (Co), zinc (Zn), $(MgO)_{0.6}(Fe_2O_3)_{0.4}$, and/or yttrium aluminate garnet ($Y_3Al_5O_{12}$).

In certain aspects, the first metal oxide composition comprises zirconium oxide ($ZrO_2$) in a partially stabilized tetragonal phase (t-$ZrO_2$). The second metal oxide composition comprises the aluminum oxide in an alpha phase (α-$Al_2O_3$). Again in certain embodiments, the first metal oxide and second metal oxide compositions are substantially free of $Y_2O_3$ (yttria). Moreover, a variety of immiscible phases besides ceria or zirconia and alumina are contemplated by the present disclosure as forming the shell, core, or other phases within the nanoparticles forming the final sintered ceramic product, or nano or micro-structured ultrafine composite product.

In accordance with the present technology, a nanoparticle optionally has an overall composition expressed by the nominal formula (t-$ZrO_2)_x$(δ-$Al_2O_3)_{1-x}$. The core-shell nanoparticle powders optionally have an average particle size diameter of about 30 to about 50 nm, thus after sintering in accordance with the present technology, form fully dense nano or micro-structured ultrafine ZTA composites with densities greater than or equal to about 99% at 50 mol % tetragonal zirconia and with final grain sizes less than about 200 nm by pressureless sintering in air at less than about 1150° C. During densification the t-zirconia is retained, whereas the original δ-$Al_2O_3$ phase shell phase transforms to the α-$Al_2O_3$ or corundum phase below the normal phase transformation temperatures for these materials at 1200° C. Furthermore, simple hand grinding stress tests demonstrate phase transformation to the monoclinic phase demonstrating that these materials offer toughening at zirconia loadings, which were previously not processable.

Similar results occur for sintering of $(CeO_2)_x$(α-$Al_2O_3)_{1-x}$ and $(CeZrO_2)_x$(δ$Al_2O_3)_{1-x}$ core-shell nanoparticle powders. This approach to sintering is generic for core-shell nanoparticle powders, where the diffusion behavior of the shell component is faster than that of the core to control sintering and densification.

Overall, the resulting ultrafine and resulting micro- and/or nanocomposites from the above materials, but especially ZTA, provide both greatly improved mechanical properties for various structural and prosthetic applications, as well as for fuel cell membranes, catalyst support materials and catalytic membranes for gas separation, for example.

Fully dense ZTA nanocomposites with 99% densities are produced from $(ZrO_2)_{0.54}(Al_2O_3)_{0.45}$ core-shell nanostructured nanopowders made by LF-FSP in accordance with the present technology. Final ZTA nano or micro-structured ultrafine composites with grain sizes less than about 200 nm are made using pressureless sintering in air at less than about 1150° C. Notably, partially stabilized t-zirconia without yttria (substantially free of yttria) is retained and the formation of α-alumina is observed after sintering at less than 1150° C. The tetragonal and monoclinic phase transformation of nano zirconia is also controlled without yttria, offering vast potential to obtain predetermined phase transformation toughening.

Accordingly, the present technology provides methods of making fully dense nanostructured ceramic nano and/or micro-structured ultrafine composites with densities greater than or equal to about 99%. In certain aspects, $(ZrO_2)_{1-x}(Al_2O_3)_x$ core-shell nanoparticle powders formed in accordance with the present technology allow production of fully dense ZTA ceramic nano or micro-structured ultrafine composites with grain sizes less than or equal to about 200 nm using pressureless sintering in air at less than or equal to about 1150° C. The tetragonal to monoclinic phase transformation of nano zirconia grains without yttria occurs by applying stress, thus supporting the potential for a variety of structural applications for the nanocomposite ceramics. These fully dense nanostructured ZTA nanocomposites offer improved strength, fracture toughness, thermal shock resistance, and thus potential for structural and especially biomedical applications.

Hence, fully densified nanostructured ZTA ceramic nano and micro-structured ultrafine composites produced by the present technology offer improved quality strength, fracture toughness, and thermal shock resistance, and thus provide potential for a wide variety of structural applications, especially, biomedical applications. The present disclosure further contemplates a variety of embodiments, including sintering of various other metals, including cerium-based and/or zirconium-cerium based (e.g., $(Zr/CeO_x)_x(Al_2O_3)_{1-x}$) core-shell nanopowders formed by methods of the present disclosure.

In some aspects, the present disclosure provides methods and compositions relating to spinel compounds. Spinel compounds exhibit a wide range of electronic, magnetic, catalytic, photonic, and structural properties suitable for a wide range of applications. The crystal structures, phase equilibria, and composition ranges of materials that form both normal and inverse spinels may be tailored for specific properties. This can include extending phase fields and improving homogeneity by using the synthesis and processing approaches described herein.

Liquid-feed flame spray pyrolysis (LF-FSP) can produce a hexagonal phase in nano-$Y_3Al_5O_{12}$ and can also provide a route to nano-α-$Al_2O_3$ (about 30-90 nm). The LF-FSP method further offers a route to produce common phase pure spinel nanopowders, for example, including those having the formula: $(MO)_{1-x}(Al_2O_3)_x$, where M=Mg, Ni, Co, Zn, and $(MgO)_{0.6}(Fe_2O_3)_{0.4}$, and can extend the phase fields of these compositions. These new spinel phase materials serve to expand the repertoire of spinel material properties.

In some embodiments of LF-FSP, alcohol solutions of metalloorganics [e.g., $Al(OCH_2CH_2)_3N$ (alumatrane) and $Mg(2,4-pentanedionato)_2$] are aerosolized with $O_2$ into a quartz chamber (about 1.5 m) and combusted at about 1500° C.-2000° C. Quenching to about 300° C. in about ≦30 µs over about 1 m gives dispersible nanopowders often with novel phases and provides a one step synthesis of the difficult to produce $Na^+$ doped β″-alumina. Examples of the present spinel materials and methods of making these spinel materials are further illustrated in Example 5 and FIGS. 9, 10, and 11.

A combination of very homogeneous mixing of ionic species in the gas phase at very high temperatures followed by a very rapid quench provides a means of producing sets of spinel nanomaterials that were previously impossible or very difficult to obtain. Furthermore, the $(MgO)_x(Fe_2O_3)_{1-x}$ powders, which are superparamagnetic, illustrate that the present approaches are not limited to aluminates.

In the examples set forth below, the characteristics of the $(ZrO_2)_{0.54}(Al_2O_3)_{0.45}$ source powder and processing source powders to fully dense ceramic composites are discussed. Next, the final ceramic composites sintered at different temperatures using the x-ray diffraction (XRD) and high resolution scanning electron microscopy (HR-SEM) are characterized. Phase transformation behavior of $(ZrO_2)_{0.54}(Al_2O_3)_{0.45}$ nanopowder compacts sintered at different temperatures is addressed. Finally, sets of various spinel nanomaterials are produced and characterized.

Example 1

Fully dense $(ZrO_2)_x(Al_2O_3)_{1-x}$ ceramic nanocomposites with homogeneous, nanosize grains are formed from LF-FSP produced core-shell nanoparticulate powders, as set forth herein. $(ZrO_2)_{1-x}(Al_2O_3)_x$ nanoparticle powders with molar ratios that span the $(ZrO_2)(Al_2O_3)$ composition range are formed. Liquid-feed flame spray pyrolysis (LF-FSP) of mixtures of $N(CH_2CH_2O)_3Al$ (alumatrane) and $Zr(CH_3CH_2COO)_2(OH)_2$ precursors dissolved in ethanol, are aerosolized with $O_2$. The resulting aerosol stream is ignited via methane pilot torches followed by combusting the mixture into quartz chamber about 1.5 m long and combusted at temperatures of about 1500-2000° C. and quenched rapidly thereafter to provide $(ZrO_2)_{1-x}(Al_2O_3)_x$ nanopowder soot collected using wire-in-tube electrostatic precipitators (ESP).

All powders exhibit average particle sizes (APSs) less than about 20 nm and corresponding surface areas of about 50 $m^2/g$ when produced at rates of 100-300 g/h. It is possible to make core-shell nanostructured $(ZrO_2)_{1-x}(Al_2O_3)_x$ nanopowders at compositions of x=about 0.3-0.8 via LF-FSP techniques in accordance with the present technology, which allows for rapid quenching of the combustion species and offers unique routes to new, metastable nanopowders with high surface energies, which were not previously accessible by other processing methods.

In one embodiment, powders produced in accordance with the LF-FSP technique above (about 3 g) are dispersed with 5 mg DARVAN®C—N (commercially available from the R.T. Vanderbilt Company, Inc) in 100 mL ethanol EtOH using a 1.2 cm diameter 500 W ultrasonic horn (sold by Sonics and Materials 600 VCX, Newtown, Conn.) at 40% of full power for 12 hours in a 500 mL Teflon beaker. The dispersion settles for 24 hours. The emulsion is further processed by adding 5 mg of polyethylene glycol 3400 D (Sigma-Aldrich) and treating with the 500 W ultrasonic horn for an additional 6 hours. Then, the dispersion is rotary evaporated for 6 hours and air-dried for 12 hours at 150° C. After 12 hours air drying, the mixture/dispersion is put in a vacuum oven at 200° C. for 12 hours. The dried powders are ground lightly for 30 min in an alumina mortar and pestle and sieved using −325 nylon mesh in an acrylic holder. The ground and sieved powder (600 mg) is pressed (50 MPa) in a dual action 12 mm WC die followed by cold isostatic pressing (CIPped) (200 MPa) (Autoclave Engineers, Erie, Pa.) for 6 hours. The pressed pellets are then sintered and subjected to binder burn out by heating in air (e.g., 1° C./min to 800° C., followed by a dwell at 800° C. for 6 hours).

FIG. 1 shows obvious unidirectional (101) lattice planes (d=0.29 nm) in a single $(ZrO_2)_{0.54}(Al_2O_3)_{0.45}$ nanoparticle. The d-spacing from the TEM images confirms XRD results showing the tetragonal phase zirconia core in $(ZrO_2)_{0.54}(Al_2O_3)_{0.45}$ nanoparticle. Therefore, as discussed above, δ-alumina is expected to sinter while preserving the single crystal t-zirconia cores due to differences in the diffusion rates between t-zirconia and δ-alumina as discussed in the following section.

Example 2

In these studies, $(ZrO_2)_{0.54}(Al_2O_3)_{0.45}$ core-shell nanopowders were processed in accordance with Example 1 and mixed with 2 wt. % binder (polyethylene glycol), cold isostactic pressed (CIPed) at about 200 MPa to form green bodies, and heated in air at about 1° C./min to 800° C. for binder burn out.

The resulting $(ZrO_2)_{0.54}(Al_2O_3)_{0.45}$ compact is cut into 12.7 mm discs with avg. 1.4 mm thickness with the diamond saw to form flat, squares with 1.27 mm sides that were placed in the dilatometer. Samples were heated in synthetic air at 5° C./min to 1425° C. providing the trace shown in FIG. 2.

Dilatometry is run using a Theta Industries Dilatronic 6500 (Port Washington, N.Y.) with a thermal expansion head under mild compression. Data is collected using LabView program. The flat, square pellets (with an average 1.27 mm on a side) used for the dilatometry runs are sectioned and placed between an alumina block and the alumina push rod. Constant heating rate (CHR) experiments are conducted with heating rate 5° C./min to 1450° C. in static air/oxygen.

Figure 2:
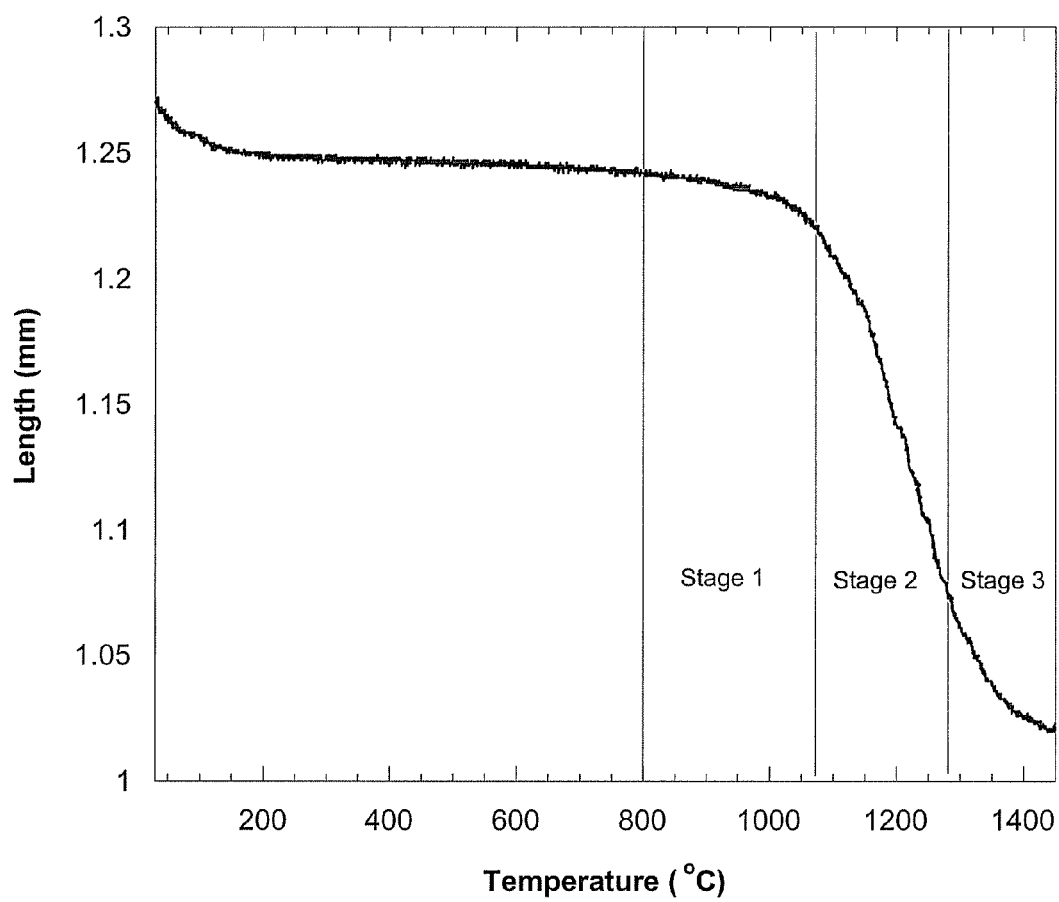
FIG. 2 is dilatometry graph showing the plot of the average of six runs of (ZrO$_2$)$_{0.54}$(Al$_2$O$_3$)$_{0.45}$ nanoparticle powder compacts ramped at a rate of 5° C./min in synthetic air.

FIG. 2 shows the three typical stages of sintering. In the first stage (800-1060° C.), sintering begins at 800° C. Here the interparticle contact area increases by neck formation. In this temperature range, external pressure and heating cause the rearrangement of grains. In the second stage (1060-1270° C.), continuous pore networks form, and the relative density increases by continuous shrinkage of pores and neck growth. Because δ-alumina has higher grain boundary diffusivity (10-23/$m^3s^{-1}$) than zirconia (10-25/$m^3s^{-1}$) at ≧800° C., the δ-alumina shell should fill the pores between grains with the tetragonal zirconia contributing little to densification.

The final stage (1270-1425° C.) begins when pores become isolated and are eventually eliminated. According to various studies on ceramic sintering, significant grain growth during this final stage is expected. In certain aspects, it is believed that this grain growth may potentially prohibit producing dense ceramic composites with grains sizes of 100 nm. Final grain sizes can be minimized in the selection of sintering temperatures of 1100-1200° C.

Based on the above dilatometer studies, final dwell temperatures for sintering are selected between 1050 and 1200° C. with ramp rates of 10° C./min, and dwell times of 6 hours in air, as described in Table 1. For density measurements (Table 1), Archimedes method is used. Full density (greater than 99%) is obtained at temperatures below about 1250° C. and preferably below about 1120° C.

TABLE 1

Relative density of $(ZrO_2)_{0.5}(Al_2O_3)_{0.5}$ pellet along processing condition.

| Processing condition | Relative density |
| --- | --- |
| Before binder | 0.46 |
| After binder | 0.51 |
| Heat to 1070° C. (10° C./min, under air) | 0.83 |
| Heat to 1120° C. (10° C./min, under air) | 0.99 |
| Heat to 1125° C. (10° C./min, under air) | 0.99 |
| Heat to 1145° C. (10° C./min, under air) | 0.99 |
| Heat to 1200° C. (10° C./min, under air) | 0.99 |

The microstructures of sintered ceramic composites are characterized by high resolution scanning electron microscopy (HR-SEM) (commercially available from FEI NOVA Dualbeam Focused Ion Beam Workstation and Scanning Electron Microscope). Pellets are polished by SiC papers from 600 grids to 2400 grids and diamond powders of diameters from 9 μm to 500 nm. Pellets are sputter coated with 1-5 nm of Au—Pd to reduce charging effects. The operating voltage is from 5.0 to 10.0 kV.

Figure 3:
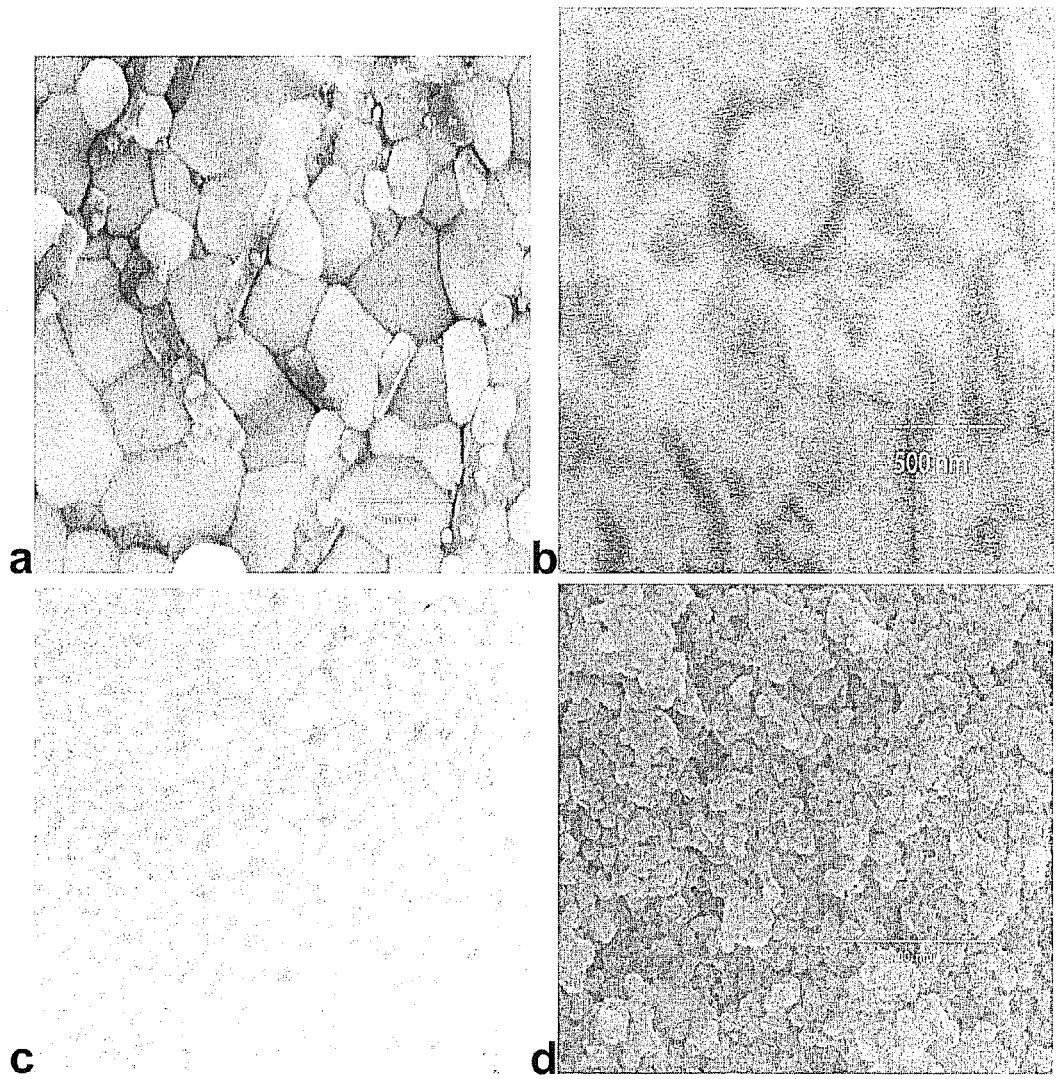
FIG. 3A is a high resolution scanning electron micrograph (HR-SEM) image of a (ZrO$_2$)$_{0.54}$(Al$_2$O$_3$)$_{0.45}$ pellet heated at 1425° C. for 0.5 for 0.5 hours at 1° C./min/air in dialtometer.
FIG. 3B is an HR-SEM image conducted under the same conditions as those used for FIG. 3A except that heating is to a temperature of 1200° C. for 6 hours.
FIG. 3C is an HR-SEM image conducted under the same conditions as those used for FIG. 3A except that heating is to a temperature of 1120° C. for 6 hours.
FIG. 3D is an HR-SEM image conducted at 1070° C. for 6 hours at 10° C./min/air in a furnace.

FIG. 3A shows the HR-SEM image of a fully dense $(ZrO_2)_{0.54}(Al_2O_3)_{0.45}$ pellet used for dilatometry studies (heated to 1425° C., ramped at 5° C./min in synthetic air). Large grains (≧1 micron) are observed, because of grain growth above 1300° C. In FIG. 3B, grain sizes found at 1200° C. are about 500 nm at nearly full density (Table 1). As expected, grain growth is slower at 1200° C. For the sample sintered at 1120° C. (FIG. 3C), the image shows average grain sizes of about 200 nm and a fully dense microstructure after polishing with diamond media. In the image of the 1070° C. sample (FIG. 3D), the final composite is observed to be not fully dense, matching the density data (0.83) in Table 1.

XRD is used to confirm the phase composition of all samples. Samples are characterized using a Rigaku Rotating Anode Goniometer. Powder and pellet samples are prepared by placing about 100 (powder), 500 (pellet) mg on XRD sample holders (amorphous silica slides) for data collection. CuKa (λ=1.54 Å) radiation with a Ni filter is used with a working voltage and current of 40 kV and 100 mA, respectively. Scans are continuous from 20-80° 2θ with a step scan of 2° 2θ/min in increments of 0.05° 2θ. Peak positions and relative ntensities are characterized by comparison with standard materials: δ-$Al_2O_3$, α-alumina, Tetragonal $ZrO_2$, and Monoclinic $ZrO_2$.

Figure 4:
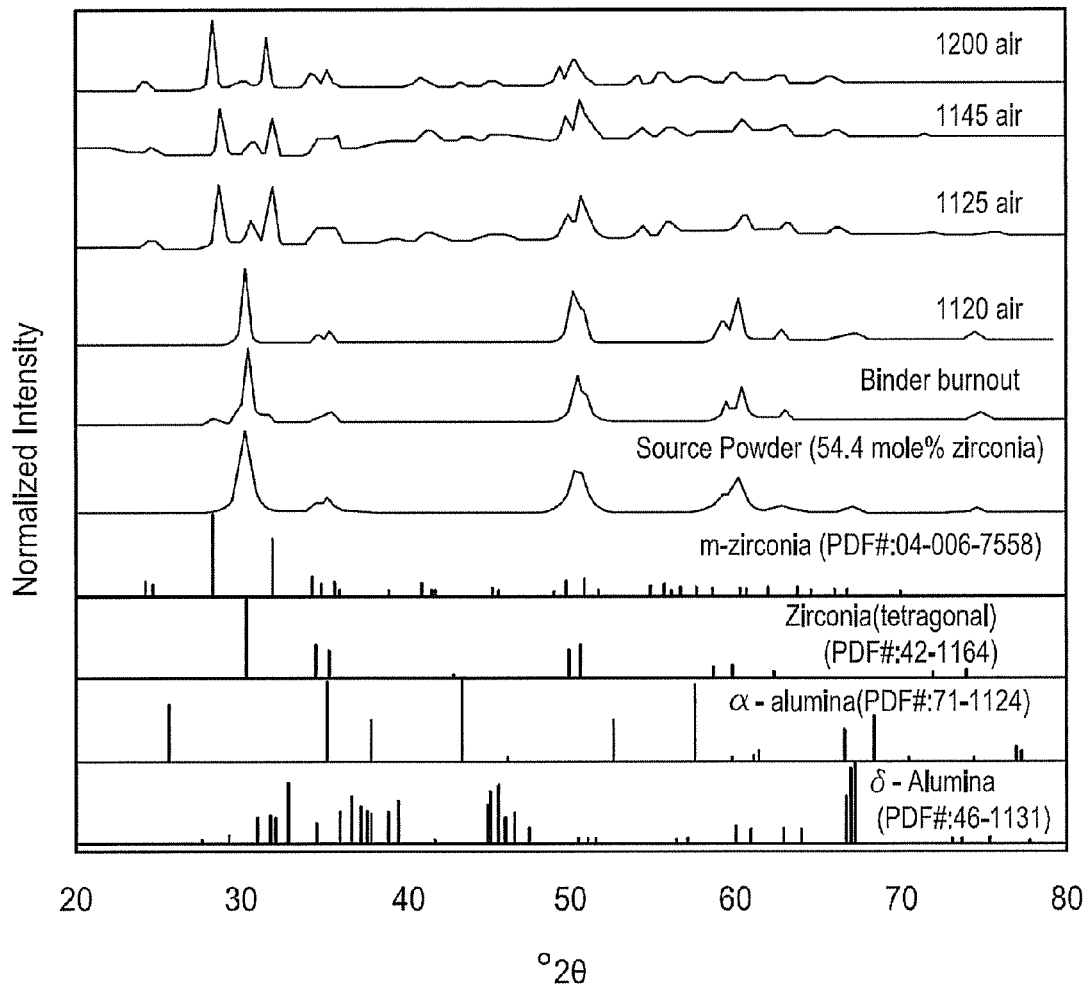
FIG. 4 is a graph depicting the X-ray diffraction (XRD) results of the gradual phase changes of various source powders and pellets at different sintering temperatures.
Figure 5:
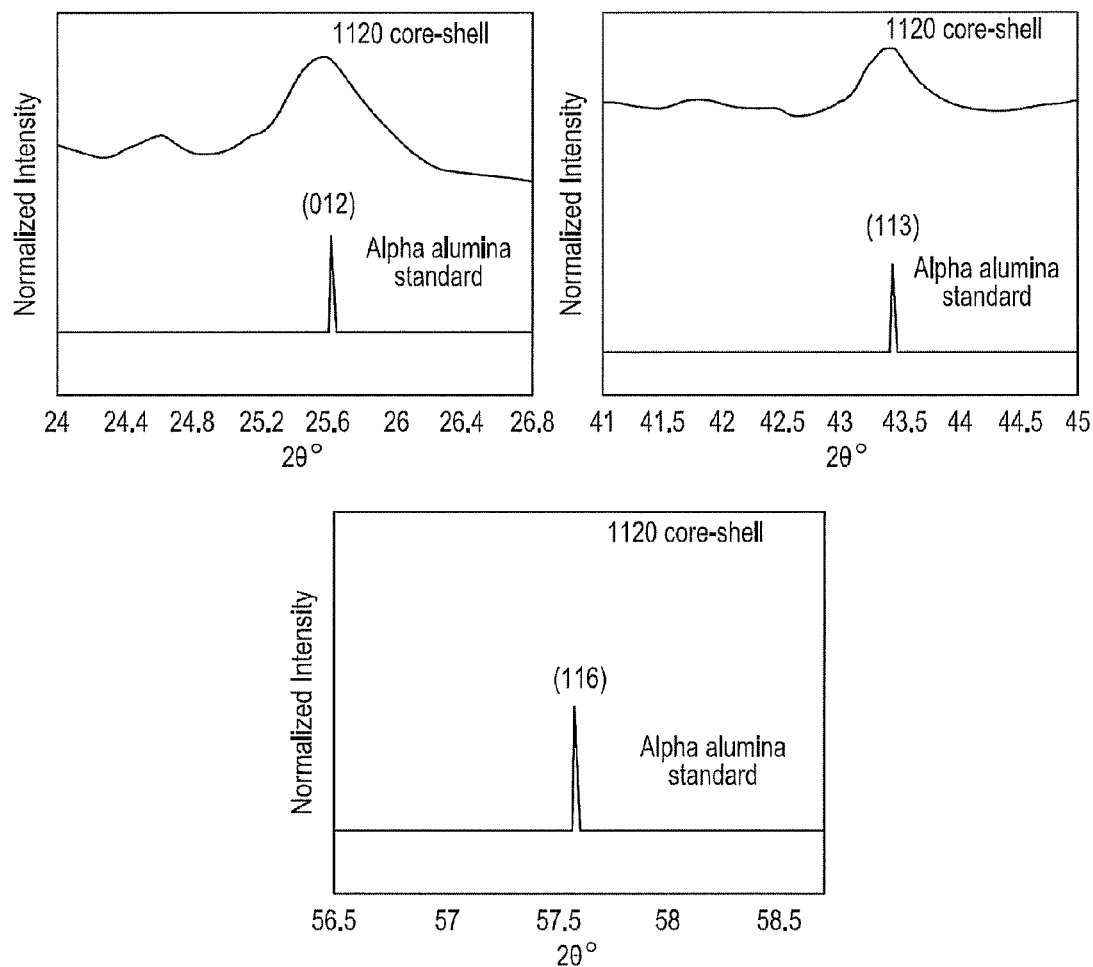
FIG. 5 is a graphic comparison of three spot-by-spot XRD samples of pellet heated to 1120° C. with α-alumina standard.
Figure 6:
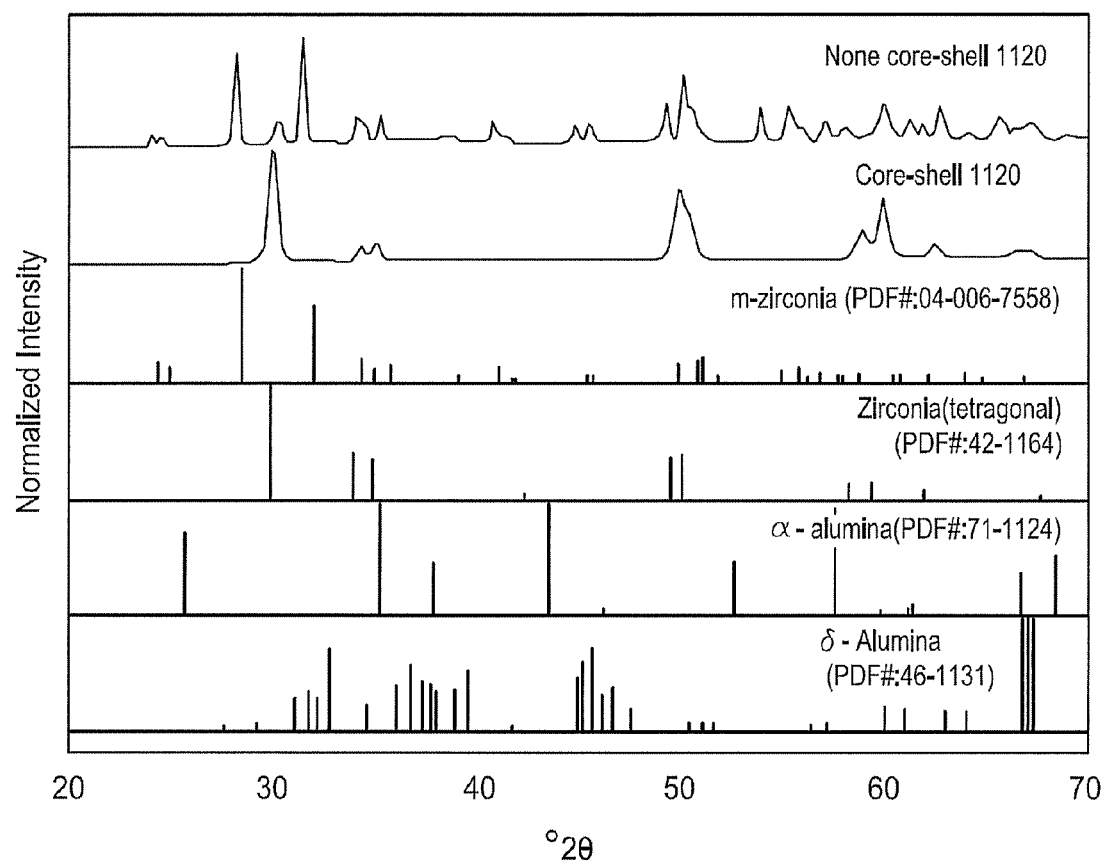
FIG. 6 is a graph depicting XRD results of the gradual phase changes of core-shell pellet and non-core-shell pellet heated to 1120° C.

In certain aspects, identifying gradual phase changes at different sintering temperatures can be useful in controlling processing and phase formation. In the XRD data of FIG. 4, zirconia is observed undergoing phase transformation from tetragonal to monoclinic between 1120° C. and 1125° C. However, fully dense ceramic nanocomposites do not appear to be producible at 1120° C. while retaining the t-zirconia phase. Confirmation of the phase of alumina for potential ZTA composites is also sought. Due to peak intensity differences between the relatively high Z zirconia and low Z alumina, spot by spot XRD in specific 2θ(°) regions is performed to identify the alumina phase in the 1120° C. sample (FIG. 5). By comparison with the (012), (113) and (116) peaks of α-alumina standard, it is found that α-alumina is the main alumina phase in these fully dense nanocomposites at 1120° C.

Example 3

After creation of fully dense $(ZrO_2)_{0.54}(Al_2O_3)_{0.45}$ nanocomposites from core-shell source Zr—Al—O powders, separate source nanopowders of t-zirconia and δ-alumina by LF-FSP are used to produce fully dense nanoparticle composites. The same procedure of green body preparation and sintering is used for these mixed oxides samples as in Example 1 for a comparison between core-shell and mixed oxides source.

Figure 7:
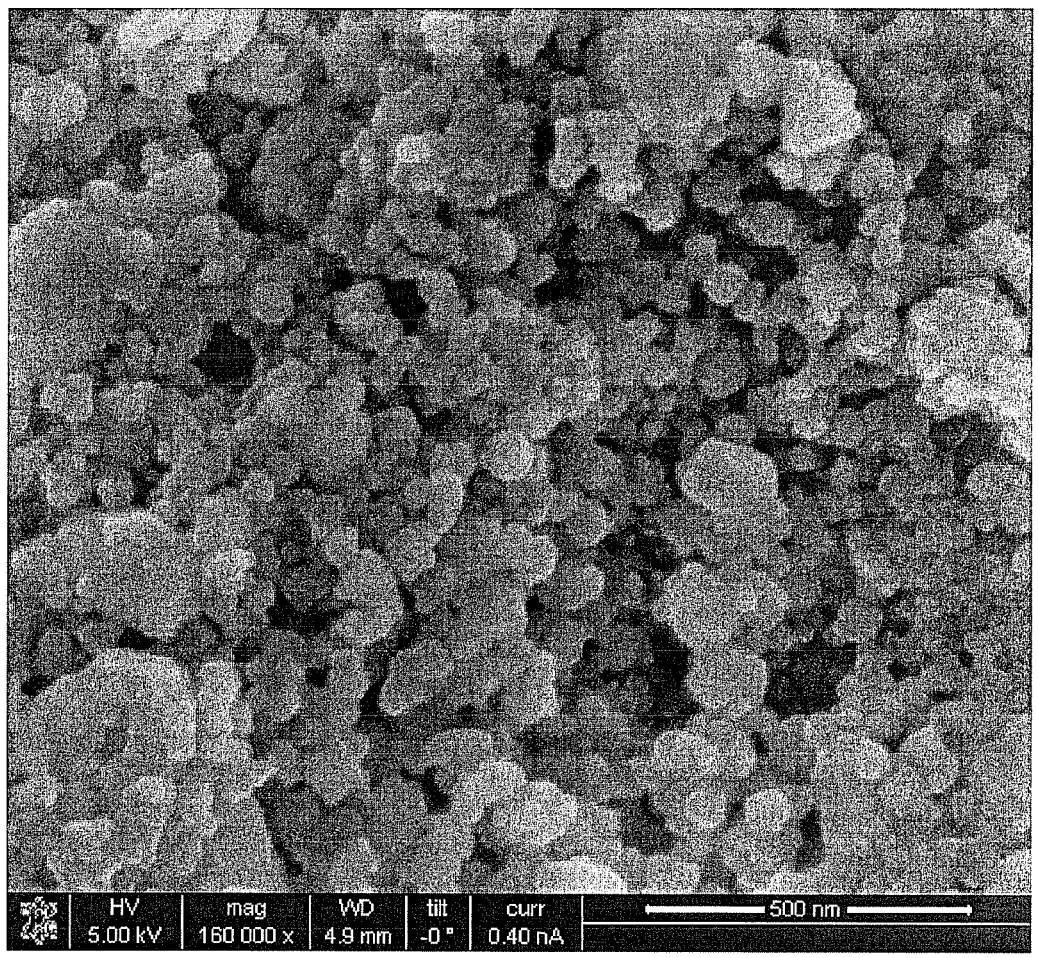
FIG. 7 is a scanning electron microscopy (SEM) image of the microstructure of non-core shell source Zr—Al—O nanoparticle composites.

According to the XRD data (FIG. 4), mixed oxides source indicate the monoclinic phase of zirconia. It is presumed that the effect of alumina on the zirconia phase transformation from tetragonal to monoclinic is not valid in this mixed oxides case, as zirconia is already converted to monoclinic below 1120° C. The relative density of this mixed oxides product is about 0.89. Microstructure of mixed oxides source composites (FIG. 7) also indicates that a final product is not a dense nanocomposite.

Example 4

Since tetragonal zirconia is present in the fully dense nanoparticle composites formed in accordance with the present technology, potential for phase transformation toughening is assessed. In many cases, the tetragonal phase of zirconia is metastable if sufficient amounts of metastable tetragonal $ZrO_2$ are present, then an applied stress, magnified by the stress concentration at a crack tip, can cause the tetragonal phase to convert to the monoclinic phase, with the associated volume expansion. This phase transformation puts the crack into compression, retarding its growth, and enhancing the fracture toughness to result in phase transformation toughening of ZTA products.

A $(ZrO_2)_{0.54}(Al_2O_3)_{0.45}$ sample made in a similar manner as set forth in Example 1 is sintered at 1120° C. and is used to observe the tetragonal to monoclinic zirconia phase transformation, as evidence of formation of partially stabilized zirconia.

Figure 8:
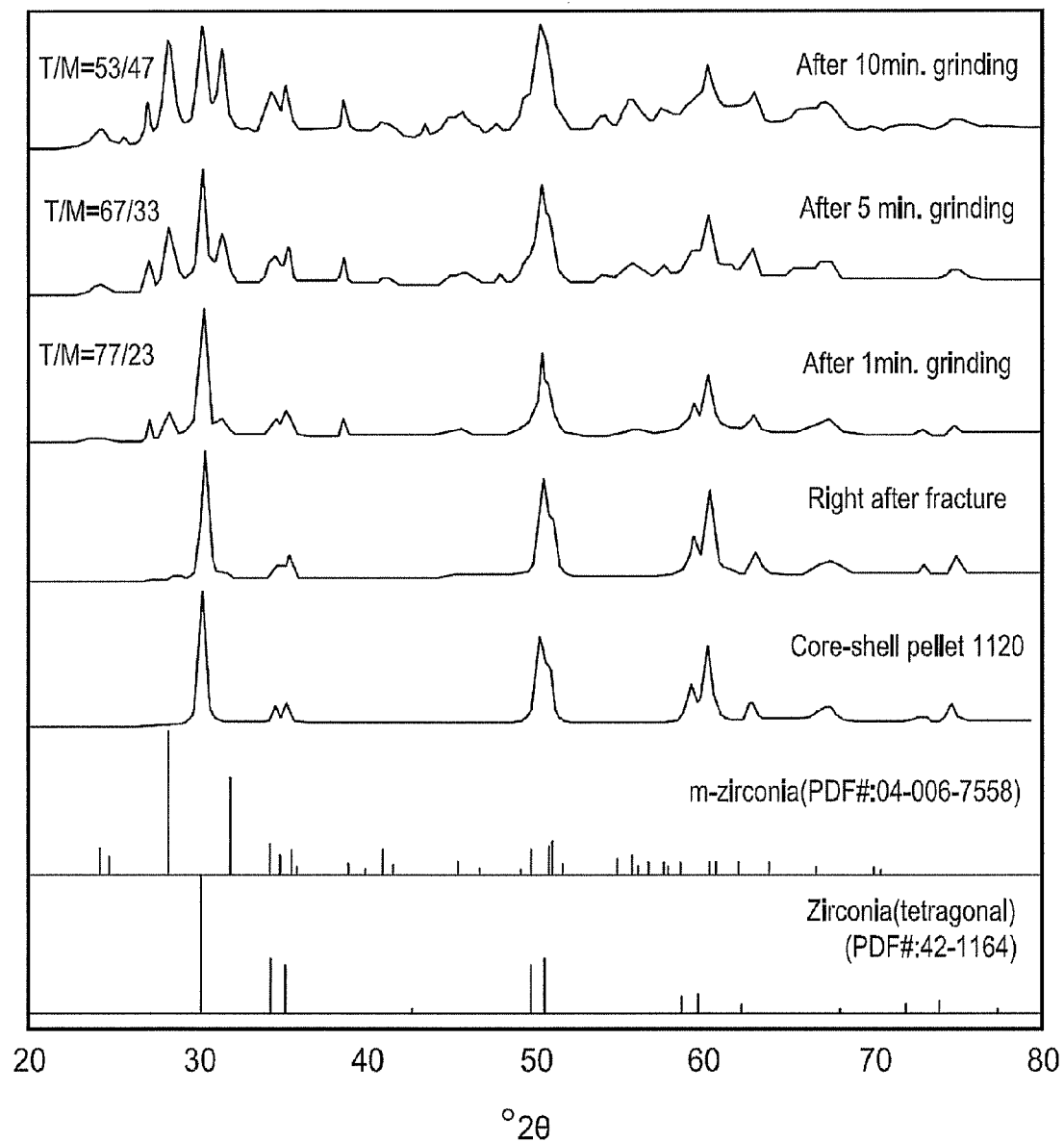
FIG. 8 is a graph depicting the XRD patterns recorded as a result of a pellet being heated to 1120° C. with the application of stress by hand-grinding at timed intervals, where T/M=weight % of tetragonal phase in zirconia/wt. % monoclinic phase in zirconia.

Stresses are applied by hand grinding with a pestle on a sample of $(ZrO_2)_{0.54}(Al_2O_3)_{0.45}$ sintered at 1120° C. XRD patterns at different times are recorded in FIG. 7. Right after fracture of 1120° C. sample, a fractured sample is ground with a pestle, and the XRDs are recorded at 1, 5, and 10 minutes in FIG. 8. XRDs both before and right after fracture show dominant tetragonal zirconia. However, the amount of monoclinic zirconia increases with increases in grinding time. After 10 minutes of grinding, the weight % of monoclinic phase in total zirconia is close to 50%. Based on this result, the ceramic nanocomposite, including metastable tetragonal phase, demonstrates advantages associated with enhanced ZTA materials having high fracture toughness.

As noted above, most conventional ZTA composites contain up to 30 wt. % (26 mole %, 24 vol. %) partially stabilized t-zirconia. In contrast, the fully dense ZTA ceramic composites produced by the present technology contain nearly 60 wt. % (54 mole %, 42 vol. %) t-zirconia. Most reported ZTA composites, including maximum 30 wt. (26 mole %, 24 vol. %) partially stabilized zirconia show final densities of less than 96% and micron size grains. In contrast, the fully dense ZTA composites produced in accordance with certain aspects of the present disclosure, including 60 wt. % (54 mole %, 42 vol. %) zirconia with grains less than about 200 nm, have improved fractured toughness by the increase in zirconia volume fraction (up to 42 vol. %) for potential structural applications.

Example 5

Figure 9:
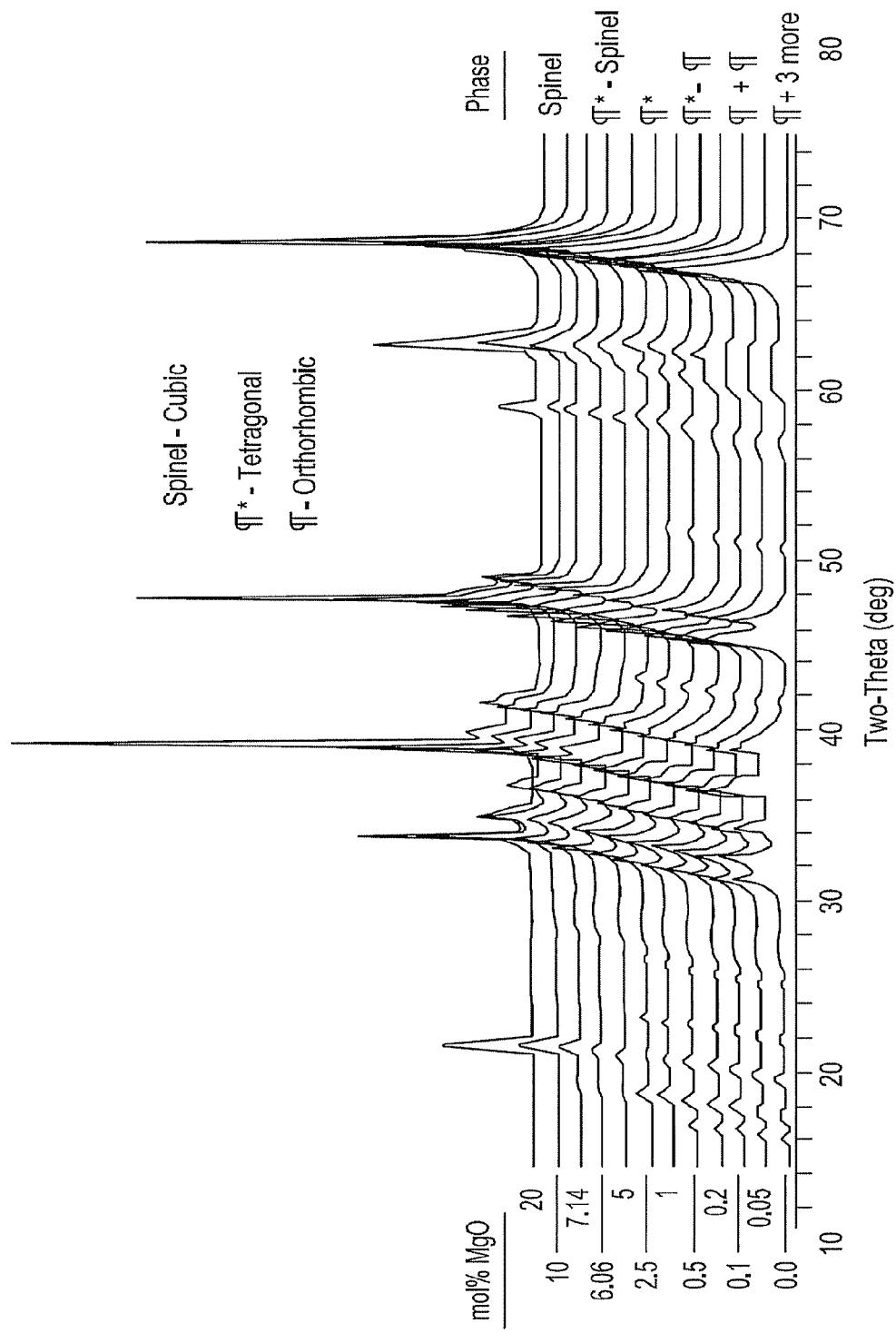
FIG. 9 is a graph depicting XRDs for (MgO)$_x$(Al$_2$O$_3$)$_{1-x}$ for x=0-20 mol %, MgO content determined by XRF.

In an effort to dope nano-α-$Al_2O_3$ with MgO to prevent grain growth during sintering, LF-FSP is used to combinatorially produce MgO doped nano-δ-$Al_2O_3$ as a prelude to a second pass through the LF-FSP system to produce Mg doped α-$Al_2O_3$. FIG. 9 shows XRDs for LF-FSP generated $(MgO)_x(Al_2O_3)_{1-x}$ nanopowders where x=0-0.20. Exact compositions are confirmed by XRF analyses.

The MgO—$Al_2O_3$ phase diagram shows that stoichiometric spinel is stable to about 2100° C. It also indicates that in the alumina rich region, off-stoichiometric spinel phase forms at 63-83 mol % $Al_2O_3$ at 1500° C.-1900° C., but the stability zone contracts rapidly at higher temperatures. In contrast, LF-FSP processing provides a material that is ≧95% spinel phase at 90 mol % $Al_2O_3$ as determined by XRD and FTIR. Furthermore, at about 94 mol %, XRD analysis indicates formation of a third phase together with a small amount of δ-$Al_2O_3$ rather than α-$Al_2O_3$, the expected second phase.

The third phase, observed at the 6.06 mol % MgO eutectic with an apparent formula of $MgAl_{31}O_{47.5}[\ ]_{0.5}$, forms near 93 mol % alumina with a formula of $MgAl_{26}O_{40}$. For $(MgO)_x(Al_2O_3)_{1-x}$, one can track the changes in specific phases observed through changes in lattice parameters and FTIR absorption band positions as a function of composition.

Figure 10:
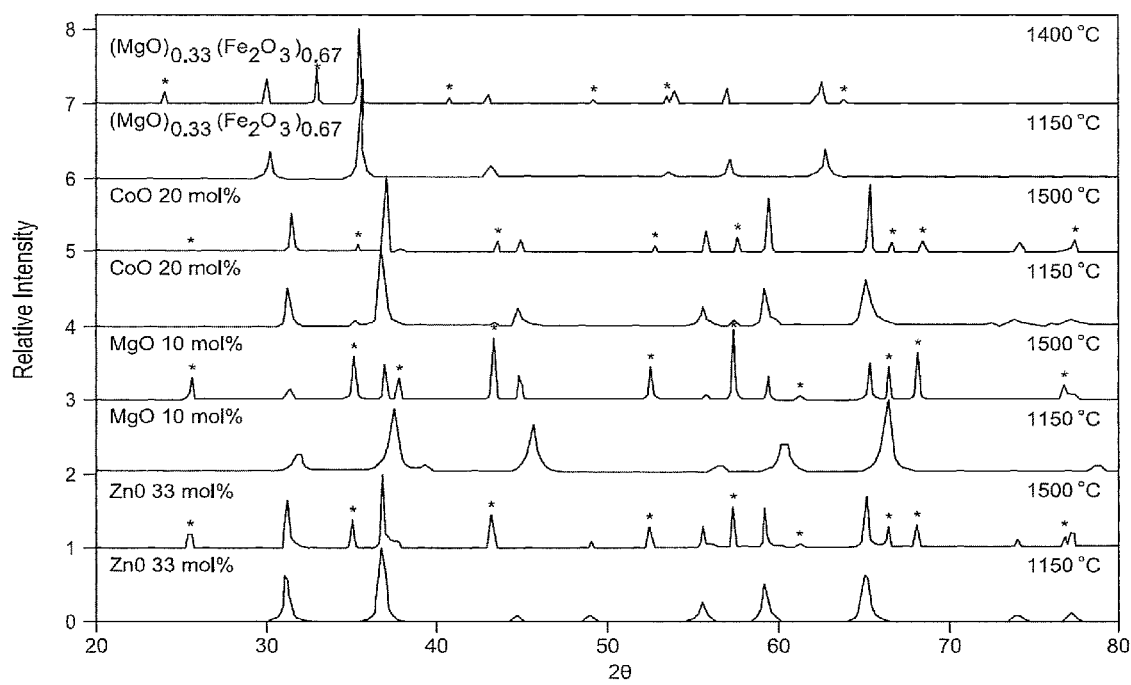
FIG. 10 is a graph depicting XRD powder patterns for (MO)$_x$(Al$_2$O$_3$)$_{1-x}$ for x as shown and (MgO)$_{0.33}$(Fe$_2$O$_3$)$_{0.67}$ for powders heated to 1150° C. (10° C./min/air) or 1500° C./12 hr, where *=α-Al$_2$O$_3$ and ♦=α-Fe$_2$O$_3$ (1400° C.)

The present technology can be combined with nickel aluminates, $(NiO)_x(Al_2O_3)_{1-x}$, for example, where LF-FSP is used to produce spinel compositions in different nano-alumina spinels. FIG. 10 provides XRDs for selected compositions of $(MO)_x(Al_2O_3)_{1-x}$, where M=Ni, Co, Mg, and Zn, and which are all stable to about 1150° C.

Figure 11:
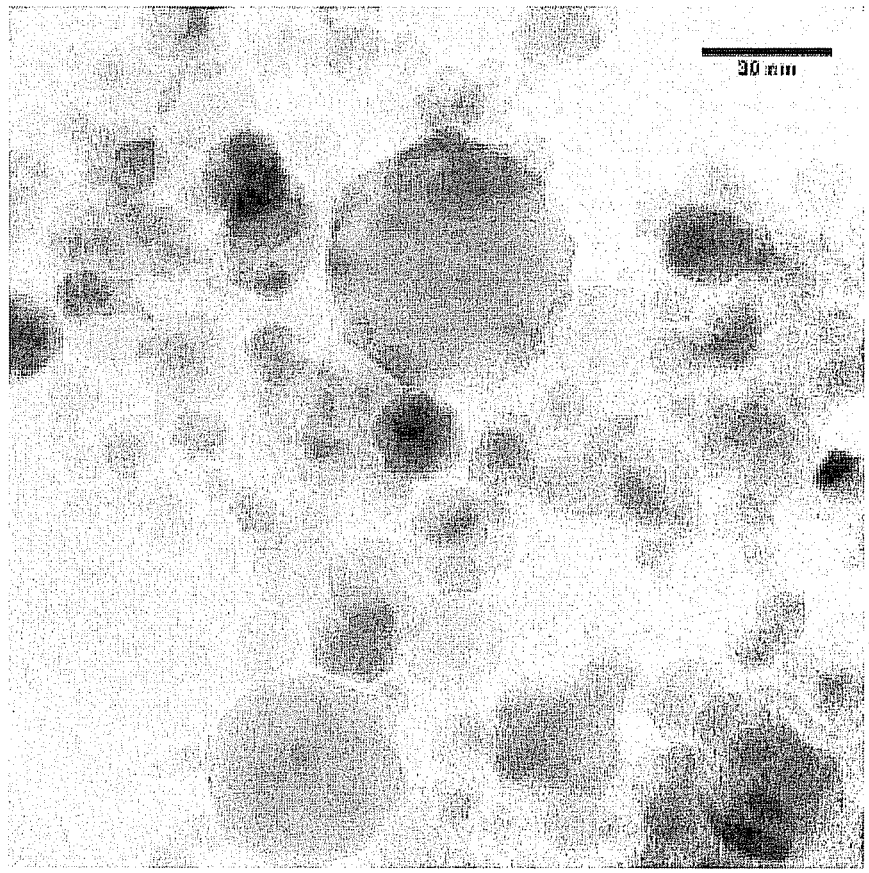
FIG. 11 shows TEM images of (a) (NiO)$_{0.22}$(Al$_2$O$_3$)$_{0.78}$ and (b) (CoO)$_{0.08}$(Al$_2$O$_3$)$_{0.92}$.
Figure 11:
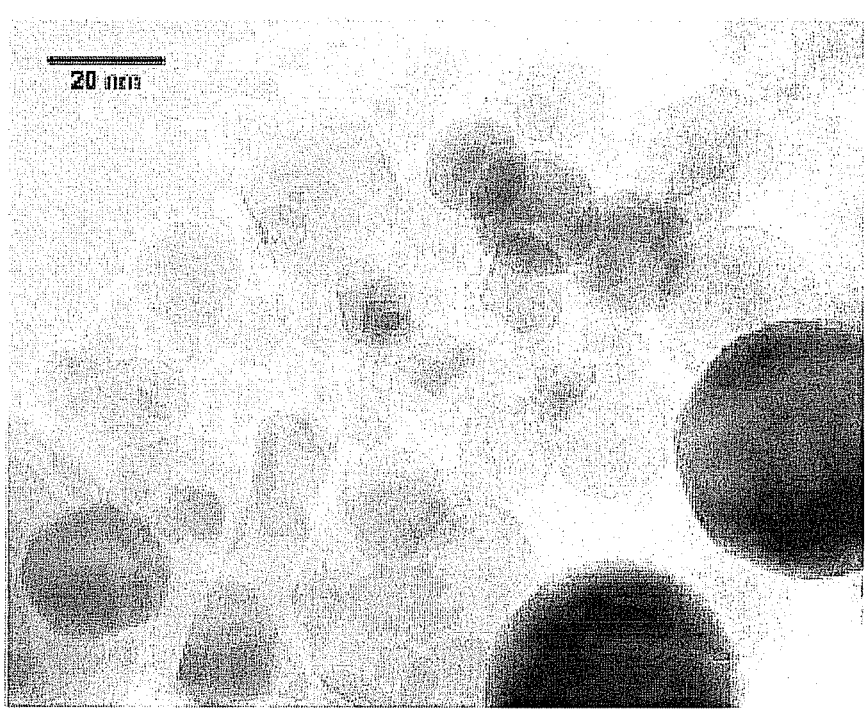

All of these nanopowders have average particle sizes of about 20-40 nm, for example as shown in FIG. 11, and corresponding surface areas of about 50-70 m2 g-1. In some instances, as in the nickel system, the materials are mostly the inverse spinel.

The $(NiO)_x(Al_2O_3)_{1-x}$ phase diagram shows a spinel phase field in the alumina rich region that extends from x=about 0.50 to 0.60 at 1500° C., but broadens to about 0.68 at temperatures near 2000° C. Thus, the observation of a pure spinel phase at x=0.78 greatly extends this phase field. The resulting spinel is very stable, resisting transformation to the phase diagram composition even on heating for about 10 h at about 1150° C., as shown in FIG. 10.

Similar observations are made for the $(CoO)_x(Al_2O_3)_{1-x}$ system, where at 1500° C. the published phase diagram in the alumina rich region extends to 45 mol % (x=0.45) but expands to 78 mol % near 1950° C. A pure spinel phase is observed at 79 mol % and mostly spinel is observed at 90 mol % along with some δ-$Al_2O_3$. This point appears to be equivalent to the thermodynamic materials. However, the materials exhibit a shift in the powder pattern of 0.3-0.4°2θ, with the secondary phase being δ-rather than α-Al2O3. The shift in °2θ may be due in part to some inverse spinel forming and may also be due to substitution of the much smaller Al3+ ion for Co2+ in tetragonal sites.

For $(ZnO)_x(Al_2O_3)_{1-x}$, the phase diagram shows that in the $Al_2O_3$ rich region at about 57 mol % $Al_2O_3$, the spinel phase is stable only in a very narrow window from about 1700° C. to 1800° C. Below 1700° C. a mixture of α-$Al_2O_3$ and spinel phase is observed. However, in the LF-FSP materials, a phase of pure spinel is observed at $(ZnO)_{0.33}(Al_2O_3)_{0.67}$, suggesting that the formation temperatures of the powders are about ≧1700° C. and that the phase pure spinel is trapped by rapid quenching. According to the phase diagram, a liquid spinel/solid α-$Al_2O_3$ mixture forms above about 1800° C. Given the size of the present particles and the fact that nanoparticles are likely to be liquid well below the bulk melting temperature, the as-produced powders may arise from liquid droplets produced in the flame.

On heating to temperatures of 1400° C.-1500° C., these materials transform to the expected phase compositions [spinel/α-$Al_2O_3$ (α-$Fe_2O_3$)] as shown in FIG. 10, confirming the true compositions of the LF-FSP produced nanopowders. However, they are all stable at about 1150° C. for prolonged periods, pointing to their potential to offer unique properties at moderate temperatures; e.g., ability to operate as catalysts.

In all of the FIG. 10 as-produced materials, the alumina rich region of the phase diagram indicates that α-$Al_2O_3$ is the expected second phase for all temperatures. Yet, only δ-$Al_2O_3$ is observed, presumably because in all cases kinetic products are produced. An alternate explanation is that δO-$Al_2O_3$ forms as a separate nanopowder product during LF-FSP rather than in an intimate phase separated mixture. However, for the phase pure materials, no evidence of a second δ-$Al_2O_3$ phase is observed, belying this explanation.

To demonstrate generality, $(MgO)_x(Fe_2O_3)_{1-x}$ materials are also prepared using the same processing conditions as for the $(MO)_x(Al_2O_3)_{1-x}$ systems. Iron propionate, $Fe(O_2CCH_2CH_3)_3$, and $Mg(2,4\text{-pentanedionato})_2$ were used to make various $(MgO)_x(Fe_2O_3)_{1-x}$ compositions in the range x=about 29-63 MgO, as measured by XRF. These nanopowders have average particle sizes of about <40 nm and corresponding surface areas of about 50 $m^2g^{-1}$, as confirmed by SEM and BET. The materials are analyzed by XRD and determined to all be single-phase magnesioferrite spinel at compositions ≦x=70.

According to the phase diagram for the $(MgO)_x(Fe_2O_3)_{1-x}$ system, these materials exist as phase separated spinel+periclase (MgO) at x>0.5, and spinel+hematite ($Fe_3O_4$) for x≦0.5. Similar to the $(MO)_x(Al_2O_3)_{1-x}$ systems, single-phase spinel is observed for compositions as much as about 15 mol % outside the thermodynamically determined phase field.

The embodiments and the examples described herein are exemplary and not intended to be limiting in describing the full scope of compositions, apparatus, systems, and methods of the present technology. Equivalent changes, modifications and variations of some embodiments, materials, compositions and methods can be made within the scope of the present technology, with substantially similar results.

What is claimed is:

1. A method of making a dense ceramic nano- and/or micro-structured or ultrafine composite, the method comprising:
aerosolizing a liquid precursor stream with oxygen to form an aerosolized stream, wherein said liquid precursor stream comprises a first metal oxide precursor and a second metal oxide precursor distinct from said first metal oxide precursor; and
combusting said aerosolized stream to form a plurality of nanoparticles having an average particle size diameter of less than or equal to about 500 nm and defining a core region comprising a first oxide composition formed from said first metal oxide precursor and a shell region comprising a second oxide composition comprising aluminum or iron formed from said second metal oxide precursor, wherein the first oxide composition has a first bulk diffusion rate that is distinct from a second bulk diffusion rate of the second oxide composition;
forming a green body from said plurality of nanoparticles;
sintering said green body to form the ceramic composite having an average actual density of greater than or equal to about 90% of a theoretical density of the sintered ceramic composite.

2. The method of claim 1, wherein the combusting further comprises forming nanoparticles having an average particle size diameter of less than or equal to about 500 nm and defining a core region comprising a first oxide composition formed from said first metal oxide precursor and a partial shell region comprising a second oxide composition formed from said second metal oxide precursor, wherein said first and second metal oxide precursors are incompletely reacted.

3. The method of claim 1, wherein the first oxide composition has a first bulk diffusion rate that is lower than a second bulk diffusion rate of the second oxide composition.

4. The method of claim 1, wherein said average actual density is greater than or equal to about 99% of said theoretical density of the sintered ceramic composite.

5. The method of claim 1, wherein at least a portion of said second oxide composition undergoes a phase transformation prior to or during said sintering.

6. The method of claim 1, wherein a ratio of the first oxide composition to the second oxide composition ranges from about 1:100 to about 100:1.

7. The method of claim 1, wherein said first oxide composition comprises zirconium oxide ($ZrO_2$) and said second oxide composition comprises aluminum oxide ($Al_2O_3$).

8. The method of claim 7, wherein at least a portion of said zirconium oxide ($ZrO_2$) is a stable tetragonal-zirconium oxide phase.

9. The method of claim 8, wherein at least a portion of said aluminum oxide ($Al_2O_3$) comprises a δ-$Al_2O_3$ phase prior to said combusting and/or said sintering that is transformed to an α-$Al_2O_3$ phase after said sintering.

10. The method of claim 7, wherein at least a portion of said zirconium oxide ($ZrO_2$) after said sintering comprises a stable tetragonal-zirconium oxide phase.

11. The method of claim 1, wherein said first oxide composition comprises an element selected from the group consisting of: zirconium (Zr), cerium (Ce), magnesium (Mg), yttrium (Y), nickel (Ni), cobalt (Co), zinc (Zn), and mixtures thereof.

12. The method of claim 1, further comprising mixing said aerosolized stream with a pre-formed particle prior to said combusting, wherein during said combusting said first metal oxide precursor and said second metal oxide precursor form a metal oxide coating on said pre-formed particle.

13. A method of making a dense ceramic nano and/or micro-structured ultrafine composite, the method comprising:
aerosolizing a liquid precursor stream with oxygen to form an aerosolized stream, wherein said liquid precursor stream comprises a first precursor comprising zirconium and a second precursor comprising aluminum;
combusting said aerosolized stream to form a plurality of nanoparticles having an average particle size diameter of less than or equal to about 500 nm, wherein each nanoparticle comprises a core region and a shell region disposed around said core region, where said core region comprises zirconium oxide ($ZrO_2$) and said shell region comprises aluminum oxide ($Al_2O_3$);
forming a green body comprising said plurality of nanoparticles;
sintering said green body to form the dense ceramic composite having an average actual density of greater than or equal to about 50% of a theoretical density of the sintered ceramic composite, wherein at least a portion of said aluminum oxide ($Al_2O_3$) comprises a $\delta$-$Al_2O_3$ phase prior to or during said sintering that is transformed to an $\alpha$-$Al_2O_3$ phase after said sintering.

14. The method of claim 13, further comprising quenching said aerosolized stream after said combusting to form said plurality of nanoparticles.

15. The method of claim 13, further comprising a heating step before said sintering that burns off any residual surface or internal impurities present from said forming of said green body.

16. The method of claim 13, wherein said sintering is conducted at a temperature and a pressure that minimizes grain growth and controls the phase transformation of $\alpha$-alumina from a $\delta$-alumina and prevents phase transformation of monoclinic zirconia phase to tetragonal zirconia phase.

17. The method of claim 13, wherein at least a portion of said zirconium oxide ($ZrO_2$) is a stable tetragonal-zirconium oxide phase.

18. The method of claim 13, wherein said average actual density is greater than or equal to about 99% of said theoretical density of the sintered ceramic composite.

19. The method of claim 13, wherein a ratio of the zirconium oxide ($ZrO_2$) to the aluminum oxide ($Al_2O_3$) ranges from about 1:100 to about 100:1.

20. A method of making a dense ceramic nano- and/or micro-structured or ultrafine composite, the method comprising:
    aerosolizing a liquid precursor stream with oxygen to form an aerosolized stream, wherein said liquid precursor stream comprises a plurality of precursor nanoparticles and a metal oxide precursor; and
    combusting said aerosolized stream to form a plurality of coated nanoparticles having an average particle size diameter of less than or equal to about 500 nm and defining a core region comprising at least one of said precursor nanoparticles and a shell region comprising an oxide composition formed from said metal oxide precursor;
    forming a green body from said plurality of coated nanoparticles;
    sintering said green body to form the ceramic composite having an average actual density of greater than or equal to about 90% of a theoretical density of the sintered ceramic composite.

21. The method of claim 20, wherein the precursor nanoparticles comprise a core region comprising a first metal oxide composition comprising at least one element selected from the group consisting of: zirconium (Zr), cerium (Ce), aluminum (Al), magnesium (Mg), yttrium (Y), nickel (Ni), cobalt (Co), zinc (Zn), iron (Fe), and mixtures thereof, and a shell region comprising a second metal oxide composition comprising aluminum oxide ($Al_2O_3$).

22. The method of claim 21, wherein said first metal oxide composition comprises cerium oxide ($CeO_2$), zirconium oxide ($ZrO_2$), cerium zirconium oxide ($CeZrO_2$), spinel or magnesium aluminate ($MgAl_2O_4$) and/or yttrium aluminate garnet ($Y_3Al_5O_{12}$).

23. The method of claim 21, wherein said first metal oxide composition comprises zirconium oxide ($ZrO_2$) in a partially stabilized tetragonal phase (t-$ZrO_2$).

24. The method of claim 21, wherein said second metal oxide composition comprises said aluminum oxide in an alpha phase ($\alpha$-$Al_2O_3$).

* * * * *